(12) United States Patent
Bevensee et al.

(10) Patent No.: US 11,156,771 B2
(45) Date of Patent: Oct. 26, 2021

(54) METHOD OF CALIBRATION FOR HOLOGRAPHIC ENERGY DIRECTING SYSTEMS

(71) Applicant: LIGHT FIELD LAB, INC., San Jose, CA (US)

(72) Inventors: Brendan Elwood Bevensee, San Jose, CA (US); Jonathan Sean Karafin, San Jose, CA (US)

(73) Assignee: Light Field Lab, Inc., San Jose, CA (US)

( * ) Notice: Subject to any disclaimer, the term of this patent is extended or adjusted under 35 U.S.C. 154(b) by 0 days.

(21) Appl. No.: 16/064,300

(22) PCT Filed: Jul. 18, 2017

(86) PCT No.: PCT/US2017/042679
§ 371 (c)(1),
(2) Date: Jun. 20, 2018

(87) PCT Pub. No.: WO2018/014049
PCT Pub. Date: Jan. 18, 2018

(65) Prior Publication Data
US 2019/0004228 A1 Jan. 3, 2019

Related U.S. Application Data

(63) Continuation-in-part of application No. PCT/US2017/042276, filed on Jul. 14, 2017, and a continuation-in-part of application No. PCT/US2017/042275, filed on Jul. 14, 2017.
(Continued)

(51) Int. Cl.
*G02B 6/08* (2006.01)
*G02B 27/09* (2006.01)
(Continued)

(52) U.S. Cl.
CPC ............ *G02B 6/08* (2013.01); *G02B 3/0056* (2013.01); *G02B 3/08* (2013.01); *G02B 5/32* (2013.01);
(Continued)

(58) Field of Classification Search
USPC ................ 359/1, 10, 22, 23, 32, 35, 103, 12
See application file for complete search history.

(56) References Cited

U.S. PATENT DOCUMENTS

| 5,374,976 A | 12/1994 | Spannenburg |
| 5,481,385 A | 1/1996 | Zimmerman et al. |

(Continued)

FOREIGN PATENT DOCUMENTS

| WO | 2014188149 | 11/2014 |
| WO | 2016046514 | 3/2016 |

OTHER PUBLICATIONS

International Search Report and Written Opinion dated Nov. 9, 2017 of International Patent Application No. PCT/US17/42679.
(Continued)

*Primary Examiner* — Robert E. Tallman
(74) *Attorney, Agent, or Firm* — Charles C. Yang

(57) ABSTRACT

Holographic energy directing systems may include a waveguide array and a relay element. Disclosed calibration approaches allows for mapping of energy locations and mapping of energy locations to angular direction of energy as defined in a four-dimensional plenopic system. Distortions due to the waveguide array and relay element may also be compensated.

18 Claims, 12 Drawing Sheets

Related U.S. Application Data

(60) Provisional application No. 62/362,602, filed on Jul. 15, 2016, provisional application No. 62/366,076, filed on Jul. 24, 2016, provisional application No. 62/507,500, filed on May 17, 2017.

(51) Int. Cl.
| | | |
|---|---|---|
| *G02B 25/00* | (2006.01) | |
| *G02B 30/00* | (2020.01) | |
| *G02B 30/33* | (2020.01) | |
| *G02B 6/02* | (2006.01) | |
| *G02B 27/00* | (2006.01) | |
| *G02B 6/04* | (2006.01) | |
| *G02B 27/10* | (2006.01) | |
| *G03H 1/22* | (2006.01) | |
| *G02B 30/56* | (2020.01) | |
| *H04N 5/89* | (2006.01) | |
| *G10K 11/26* | (2006.01) | |
| *G21K 1/00* | (2006.01) | |
| *G02B 6/293* | (2006.01) | |
| *H04N 5/225* | (2006.01) | |
| *G02B 3/00* | (2006.01) | |
| *G02B 3/08* | (2006.01) | |
| *H04N 13/344* | (2018.01) | |
| *G02B 5/32* | (2006.01) | |
| *G02B 27/01* | (2006.01) | |
| *G03H 1/02* | (2006.01) | |
| *G06F 3/01* | (2006.01) | |
| *H04N 13/388* | (2018.01) | |
| *G03H 1/00* | (2006.01) | |

(52) U.S. Cl.
CPC ......... *G02B 6/023* (2013.01); *G02B 6/02042* (2013.01); *G02B 6/02295* (2013.01); *G02B 6/04* (2013.01); *G02B 6/29325* (2013.01); *G02B 25/00* (2013.01); *G02B 25/002* (2013.01); *G02B 27/0093* (2013.01); *G02B 27/0103* (2013.01); *G02B 27/0172* (2013.01); *G02B 27/0955* (2013.01); *G02B 27/0994* (2013.01); *G02B 27/1066* (2013.01); *G02B 27/1073* (2013.01); *G02B 30/00* (2020.01); *G02B 30/33* (2020.01); *G02B 30/56* (2020.01); *G03H 1/0005* (2013.01); *G03H 1/0248* (2013.01); *G03H 1/2202* (2013.01); *G03H 1/2294* (2013.01); *G06F 3/01* (2013.01); *G06F 3/013* (2013.01); *G10K 11/26* (2013.01); *G21K 1/00* (2013.01); *H04N 5/22541* (2018.08); *H04N 5/89* (2013.01); *H04N 13/344* (2018.05); *H04N 13/388* (2018.05); *G02B 6/0229* (2013.01); *G02B 2027/0105* (2013.01); *G02B 2027/0134* (2013.01); *G02B 2027/0174* (2013.01); *G03H 2001/0088* (2013.01); *G03H 2223/19* (2013.01); *Y02E 10/52* (2013.01)

(56) References Cited

U.S. PATENT DOCUMENTS

| | | | |
|---|---|---|---|
| 6,556,280 B1 | 4/2003 | Kelsey et al. | |
| 6,680,761 B1 | 1/2004 | Greene et al. | |
| 7,203,005 B2 * | 4/2007 | Jiang | G02B 27/0101 345/7 |
| 7,329,982 B2 | 2/2008 | Conner et al. | |
| 8,369,546 B2 | 2/2013 | Pompei | |
| 8,743,466 B2 | 6/2014 | Yamamoto | |
| 8,879,766 B1 | 11/2014 | Zhang | |
| 9,411,511 B1 | 8/2016 | Sivertsen | |
| 2003/0030912 A1 | 2/2003 | Gleckman et al. | |
| 2004/0135100 A1 | 7/2004 | Menon et al. | |
| 2004/0108806 A1 | 10/2004 | Cok et al. | |
| 2005/0119575 A1 | 6/2005 | Ladabaum et al. | |
| 2005/0260677 A1 | 11/2005 | Saaski | |
| 2006/0171007 A1 * | 8/2006 | Chen | B32B 17/10036 359/13 |
| 2006/0191566 A1 | 8/2006 | Schaffsma | |
| 2007/0091638 A1 | 4/2007 | Ijzerman et al. | |
| 2007/0097321 A1 | 5/2007 | Whitehead et al. | |
| 2008/0035834 A1 | 2/2008 | Gleckler | |
| 2008/0170293 A1 | 7/2008 | Lucente et al. | |
| 2008/0192313 A1 | 8/2008 | Matsumura et al. | |
| 2009/0235750 A1 | 9/2009 | Chang | |
| 2009/0247305 A1 | 10/2009 | Kanekal | |
| 2009/0273575 A1 | 11/2009 | Pryor | |
| 2010/0245824 A1 | 9/2010 | Schwarz | |
| 2010/0278480 A1 | 11/2010 | Vasylyev | |
| 2011/0254980 A1 | 10/2011 | Perchant et al. | |
| 2012/0206390 A1 | 8/2012 | Ueno et al. | |
| 2012/0206726 A1 | 8/2012 | Pervez et al. | |
| 2012/0268950 A1 | 10/2012 | Parkyn et al. | |
| 2012/0300044 A1 | 11/2012 | Thomas et al. | |
| 2013/0127832 A1 | 5/2013 | Lee | |
| 2013/0163089 A1 | 6/2013 | Bohn | |
| 2013/0195410 A1 | 8/2013 | Karbasivalashani et al. | |
| 2013/0265485 A1 | 10/2013 | Kang | |
| 2014/0043370 A1 | 2/2014 | Payne et al. | |
| 2014/0072141 A1 | 3/2014 | Cohen | |
| 2014/0126322 A1 | 5/2014 | Cipolla et al. | |
| 2014/0132694 A1 | 5/2014 | Shacham et al. | |
| 2014/0253613 A1 | 9/2014 | Gilbert | |
| 2014/0371353 A1 | 12/2014 | Mitchel et al. | |
| 2015/0007025 A1 | 1/2015 | Sassi | |
| 2015/0016777 A1 | 1/2015 | Abovitz et al. | |
| 2015/0022754 A1 | 1/2015 | Jepsen | |
| 2015/0178939 A1 | 6/2015 | Bradski et al. | |
| 2015/0185841 A1 | 7/2015 | Levesque | |
| 2015/0192995 A1 | 7/2015 | Subramanian | |
| 2015/0219940 A1 | 8/2015 | Kim et al. | |
| 2015/0277378 A1 | 10/2015 | Smithwick | |
| 2015/0331241 A1 | 11/2015 | Haddick | |
| 2016/0041386 A1 * | 2/2016 | Rodriguez Moreno | G02B 27/0101 345/7 |
| 2016/0070059 A1 | 3/2016 | Chen et al. | |
| 2016/0180511 A1 | 6/2016 | Zhou et al. | |
| 2016/0205394 A1 | 7/2016 | Meng et al. | |
| 2016/0223988 A1 | 8/2016 | Bove | |

OTHER PUBLICATIONS

International Search Report and Written Opinion of PCT/US17/42452 dated Nov. 17, 2017.
International Search Report and Written Opinion of PCT/US17/42275 dated Dec. 4, 2017.
International Search Report and Written Opinion of PCT/US17/42468 dated Nov. 27, 2017.
International Search Report and Written Opinion of PCT/US17/42470 dated Dec. 28, 2017.
International Search Report and Written Opinion of PCT/US17/42418 dated Dec. 20, 2017.
International Search Report and Written Opinion of PCT/US17/42467 dated Dec. 27, 2017.
International Search Report and Written Opinion of PCT/US2017/042466 dated Nov. 28, 2017.
International Search Report and Written Opinion of PCT/US2016/23753 dated Jul. 15, 2016.
EP-17828633.2 European Extended Search Report of European Patent Office dated Oct. 23, 2020.
NZ-743820 First Examination Report dated Aug. 30, 2018.
NZ-743820 Further Examination Report dated Feb. 25, 2019.

* cited by examiner

METHOD OF CALIBRATION FOR HOLOGRAPHIC ENERGY DIRECTING SYSTEMS

TECHNICAL FIELD

The present disclosure generally relates to methods for calibration of holographic energy system, and more specifically, to methods for calibrating relay elements and waveguide elements of holographic energy systems.

BACKGROUND

The dream of an interactive virtual world within a "holodeck" chamber as popularized by Gene Roddenberry's Star Trek and originally envisioned by author Alexander Moszkowski in the early 1900s has been the inspiration for science fiction and technological innovation for nearly a century. However, no compelling implementation of this experience exists outside of literature, media, and the collective imagination of children and adults alike.

SUMMARY

An embodiment of the present disclosure is directed to a method of calibration for an energy relay element, wherein the energy relay element is configured such that energy propagating through the energy relay element has higher transport efficiency in a longitudinal orientation. The method may include receiving data of energy attributes of energy at a first plurality of energy locations at a first surface of an energy relay element, wherein energy at the first plurality of energy locations was relayed from a second plurality of energy locations through the energy relay element along the longitudinal orientation. The method may further include correlating predetermined data of energy attributes of energy at the second plurality of energy locations and the data of energy attributes of energy at the first plurality of energy locations to create a calibrated relay function. In an embodiment, the calibrated relay function comprises a mapping of the energy attributes at the first plurality of energy locations to the energy attributes at the second plurality of energy.

An embodiment of a method of calibration for an energy waveguide array is disclosed, in which the energy waveguide array operable to direct energy along uninhibited energy propagation paths extending from a first side to a second side of the energy waveguide array, wherein the uninhibited energy propagation paths extend, on the first side, to a plurality of energy locations, and extend, on the second side, along different angular directions relative to the energy waveguide array depending on the respective energy locations on the first side. The method may include receiving data of energy attributes of energy along the uninhibited energy propagation paths on the second side of the waveguide array. The method may further include correlating data of energy attributes of energy at the plurality of energy locations and the data of energy attributes of energy along the uninhibited energy propagation paths on the second side of the waveguide array to create a calibrated four-dimensional (4D) plenoptic function for the energy waveguide array. In an embodiment, the calibration 4D plenoptic function comprises a mapping between the plurality of energy locations and the respective angular directions of the uninhibited energy propagation paths.

A method of calibration for an energy directing system is disclosed, in which an energy relay element of the energy directing system is configured such that energy propagating through the energy relay element has higher transport efficiency in a longitudinal orientation, and an energy waveguide array of the energy directing system is operable to direct energy along uninhibited energy propagation paths extending from a first side to a second side of the energy waveguide array, wherein the uninhibited energy propagation paths extend, on the first side, to a plurality of relayed energy locations, and extend, on the second side, along different angular directions relative to the energy waveguide array depending on the respective energy locations on the first side. The method may include receiving data of energy attributes of energy at a plurality of relayed energy locations at a first surface of an energy relay element, wherein energy at the first plurality of energy locations was relayed from a plurality of source energy locations through the energy relay element along the longitudinal orientation. The method may further include correlating predetermined data of energy attributes of energy at the plurality of source energy locations and the data of energy attributes of energy at the plurality of relayed energy locations to create a calibrated relay function, wherein the calibrated relay function comprises a mapping of the energy attributes at the first plurality of energy locations to the energy attributes at the second plurality of energy. The method may further include receiving data of energy attributes of energy along the uninhibited energy propagation paths on the second side of the waveguide array and correlating data of energy attributes of energy at the plurality of relayed energy locations and the data of energy attributes of energy along the uninhibited energy propagation paths on the second side of the waveguide array to create a calibrated four-dimensional (4D) plenoptic function for the energy waveguide array, wherein the calibration 4D plenoptic function comprises a mapping between the plurality of energy locations and the respective angular directions of the uninhibited energy propagation paths.

BRIEF DESCRIPTION OF THE DRAWINGS

Embodiments are illustrated by way of example in the accompanying figures, in which like reference numbers indicate similar parts, and in which.

DETAILED DESCRIPTIONS

Figure 1:
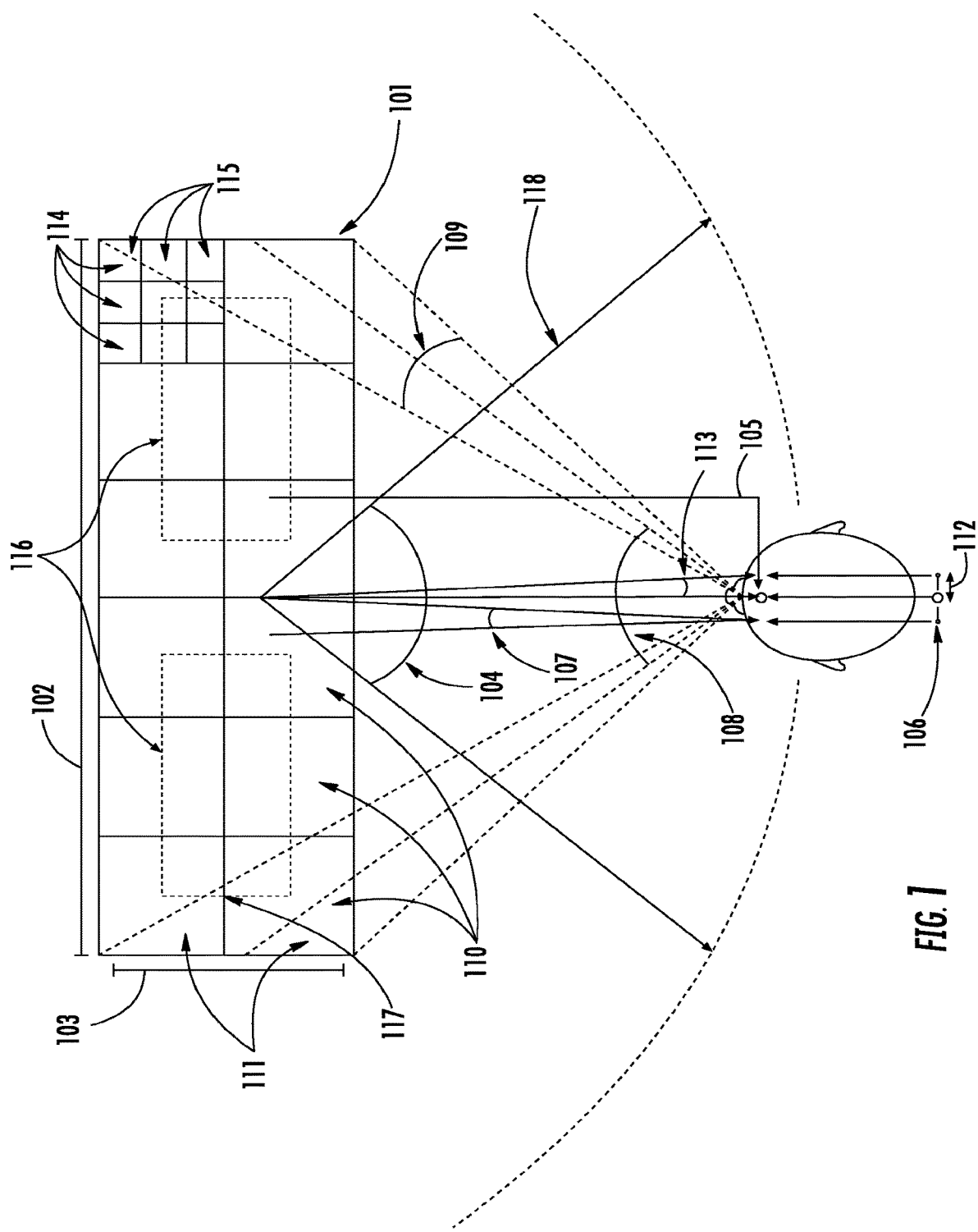
FIG. 1 is a schematic diagram illustrating design parameters for an energy directing system.

While the making and using of various embodiments of the present disclosure are discussed in detail below, it should be appreciated that the present disclosure provides many applicable inventive concepts that can be embodied in a wide variety of specific contexts. The specific embodiments discussed herein are merely illustrative of specific ways to make and use the disclosure and do not limit the scope of the disclosure.

An embodiment of a Holodeck (collectively called "Holodeck Design Parameters") provide sufficient energy stimulus to fool the human sensory receptors into believing that received energy impulses within a virtual, social and interactive environment are real, providing: 1) binocular disparity without external accessories, head-mounted eyewear, or other peripherals; 2) accurate motion parallax, occlusion and opacity throughout a viewing volume simultaneously for any number of viewers; 3) visual focus through synchronous convergence, accommodation and miosis of the eye for all perceived rays of light; and 4) converging energy wave propagation of sufficient density and resolution to exceed the human sensory "resolution" for vision, hearing, touch, taste, smell, and/or balance.

Based upon conventional technology to date, we are decades, if not centuries away from a technology capable of providing for all receptive fields in a compelling way as suggested by the Holodeck Design Parameters including the visual, auditory, somatosensory, gustatory, olfactory, and vestibular systems.

In this disclosure, the terms light field and holographic may be used interchangeably to define the energy propagation for stimulation of any sensory receptor response. While initial disclosures may refer to examples of electromagnetic and mechanical energy propagation through energy surfaces for holographic imagery and volumetric haptics, all forms of sensory receptors are envisioned in this disclosure. Furthermore, the principles disclosed herein for energy propagation along propagation paths may be applicable to both energy emission and energy capture.

Many technologies exist today that are often unfortunately confused with holograms including lenticular printing, Pepper's Ghost, glasses-free stereoscopic displays, horizontal parallax displays, head-mounted VR and AR displays (HMD), and other such illusions generalized as "fauxlography." These technologies may exhibit some of the desired properties of a true holographic display, however, lack the ability to stimulate the human visual sensory response in any way sufficient to address at least two of the four identified Holodeck Design Parameters.

These challenges have not been successfully implemented by conventional technology to produce a seamless energy surface sufficient for holographic energy propagation. There are various approaches to implementing volumetric and direction multiplexed light field displays including parallax barriers, hogels, voxels, diffractive optics, multi-view projection, holographic diffusers, rotational mirrors, multilayered displays, time sequential displays, head mounted display, etc., however, conventional approaches may involve a compromise on image quality, resolution, angular sampling density, size, cost, safety, frame rate, etc., ultimately resulting in an unviable technology.

To achieve the Holodeck Design Parameters for the visual, auditory, somatosensory systems, the human acuity of each of the respective systems is studied and understood to propagate energy waves to sufficiently fool the human sensory receptors. The visual system is capable of resolving to approximately 1 arc min, the auditory system may distinguish the difference in placement as little as three degrees, and the somatosensory system at the hands are capable of discerning points separated by 2-12 mm. While there are various and conflicting ways to measure these acuities, these values are sufficient to understand the systems and methods to stimulate perception of energy propagation.

Of the noted sensory receptors, the human visual system is by far the most sensitive given that even a single photon can induce sensation. For this reason, much of this introduction will focus on visual energy wave propagation, and vastly lower resolution energy systems coupled within a disclosed energy waveguide surface may converge appropriate signals to induce holographic sensory perception. Unless otherwise noted, all disclosures apply to all energy and sensory domains.

When calculating for effective design parameters of the energy propagation for the visual system given a viewing volume and viewing distance, a desired energy surface may be designed to include many gigapixels of effective energy location density. For wide viewing volumes, or near field viewing, the design parameters of a desired energy surface may include hundreds of gigapixels or more of effective energy location density. By comparison, a desired energy source may be designed to have 1 to 250 effective megapixels of energy location density for ultrasonic propagation of volumetric haptics or an array of 36 to 3,600 effective energy locations for acoustic propagation of holographic sound depending on input environmental variables. What is important to note is that with a disclosed bidirectional energy surface architecture, all components may be configured to form the appropriate structures for any energy domain to enable holographic propagation.

However, the main challenge to enable the Holodeck today involves available visual technologies and electromagnetic device limitations. Acoustic and ultrasonic devices are less challenging given the orders of magnitude difference in desired density based upon sensory acuity in the respective receptive field, although the complexity should not be underestimated. While holographic emulsion exists with resolutions exceeding the desired density to encode interference patterns in static imagery, state-of-the-art display devices are limited by resolution, data throughput and manufacturing feasibility. To date, no singular display device has been able to meaningfully produce a light field having near holographic resolution for visual acuity.

Production of a single silicon-based device capable of meeting the desired resolution for a compelling light field display may not be practical and may involve extremely complex fabrication processes beyond the current manufacturing capabilities. The limitation to tiling multiple existing display devices together involves the seams and gap formed by the physical size of packaging, electronics, enclosure, optics and a number of other challenges that inevitably result in an unviable technology from an imaging, cost and/or a size standpoint.

The embodiments disclosed herein may provide a real-world path to building the Holodeck.

Example embodiments will now be described hereinafter with reference to the accompanying drawings, which form a part hereof, and which illustrate example embodiments which may be practiced. As used in the disclosures and the appended claims, the terms "embodiment", "example embodiment", and "exemplary embodiment" do not necessarily refer to a single embodiment, although they may, and various example embodiments may be readily combined and interchanged, without departing from the scope or spirit of example embodiments. Furthermore, the terminology as used herein is for the purpose of describing example embodiments only and is not intended to be limitations. In this respect, as used herein, the term "in" may include "in" and "on", and the terms "a," "an" and "the" may include singular and plural references. Furthermore, as used herein, the term "by" may also mean "from", depending on the context. Furthermore, as used herein, the term "if" may also mean "when" or "upon," depending on the context. Furthermore, as used herein, the words "and/or" may refer to and encompass any and all possible combinations of one or more of the associated listed items.

Holographic System Considerations

Overview of Light Field Energy Propagation Resolution

Light field and holographic display is the result of a plurality of projections where energy surface locations provide angular, color and intensity information propagated within a viewing volume. The disclosed energy surface provides opportunities for additional information to coexist and propagate through the same surface to induce other sensory system responses. Unlike a stereoscopic display, the viewed position of the converged energy propagation paths in space do not vary as the viewer moves around the viewing volume and any number of viewers may simultaneously see propagated objects in real-world space as if it was truly there. In some embodiments, the propagation of energy may be located in the same energy propagation path but in opposite directions. For example, energy emission and energy capture along an energy propagation path are both possible in some embodiments of the present disclosed.

FIG. 1 is a schematic diagram illustrating variables relevant for stimulation of sensory receptor response. These variables may include surface diagonal 101, surface width 102, surface height 103, a determined target seating distance 118, the target seating field of view field of view from the center of the display 104, the number of intermediate samples demonstrated here as samples between the eyes 105, the average adult inter-ocular separation 106, the average resolution of the human eye in arcmin 107, the horizontal field of view formed between the target viewer location and the surface width 108, the vertical field of view formed between the target viewer location and the surface height 109, the resultant horizontal waveguide element resolution, or total number of elements, across the surface 110, the resultant vertical waveguide element resolution, or total number of elements, across the surface 111, the sample distance based upon the inter-ocular spacing between the eyes and the number of intermediate samples for angular projection between the eyes 112, the angular sampling may be based upon the sample distance and the target seating distance 113, the total resolution Horizontal per waveguide element derived from the angular sampling desired 114, the total resolution Vertical per waveguide element derived from the angular sampling desired 115, device Horizontal is the count of the determined number of discreet energy sources desired 116, and device Vertical is the count of the determined number of discreet energy sources desired 117.

A method to understand the desired minimum resolution may be based upon the following criteria to ensure sufficient stimulation of visual (or other) sensory receptor response: surface size (e.g., 84" diagonal), surface aspect ratio (e.g., 16:9), seating distance (e.g., 128" from the display), seating field of view (e.g., 120 degrees or ±60 degrees about the center of the display), desired intermediate samples at a distance (e.g., one additional propagation path between the eyes), the average inter-ocular separation of an adult (approximately 65 mm), and the average resolution of the human eye (approximately 1 arcmin). These example values should be considered placeholders depending on the specific application design parameters.

Further, each of the values attributed to the visual sensory receptors may be replaced with other systems to determine desired propagation path parameters. For other energy propagation embodiments, one may consider the auditory system's angular sensitivity as low as three degrees, and the somatosensory system's spatial resolution of the hands as small as 2-12 mm.

While there are various and conflicting ways to measure these sensory acuities, these values are sufficient to understand the systems and methods to stimulate perception of virtual energy propagation. There are many ways to consider the design resolution, and the below proposed methodology combines pragmatic product considerations with the biological resolving limits of the sensory systems. As will be appreciated by one of ordinary skill in the art, the following overview is a simplification of any such system design, and should be considered for exemplary purposes only.

With the resolution limit of the sensory system understood, the total energy waveguide element density may be calculated such that the receiving sensory system cannot discern a single energy waveguide element from an adjacent element, given:

$$\text{Surface Aspect Ratio} = \frac{\text{Width }(W)}{\text{Height }(H)}$$

$$\text{Surface Horizontal Size} = \text{Surface Diagonal} * \left( \frac{1}{\sqrt{1 + \left(\frac{H}{W}\right)^2}} \right)$$

$$\text{Surface Vertical Size} = \text{Surface Diagonal} * \left( \frac{1}{\sqrt{1 + \left(\frac{H}{W}\right)^2}} \right)$$

$$\text{Horizontal Field of View} = 2 * \text{atan}\left( \frac{\text{Surface Horizontal Size}}{2 * \text{Seating Distance}} \right)$$

$$\text{Vertical Field of View} = 2 * \text{atan}\left( \frac{\text{Surface Vertical Size}}{2 * \text{Seating Distance}} \right)$$

$$\text{Horizontal Element Resolution} = \text{Horizontal } FoV * \frac{60}{\text{Eye Resoulution}}$$

$$\text{Vertical Element Resolution} = \text{Vertical } FoV * \frac{60}{\text{Eye Resoulution}}$$

The above calculations result in approximately a 32×18° field of view resulting in approximately 1920×1080 (rounded to nearest format) energy waveguide elements being desired. One may also constrain the variables such that the field of view is consistent for both (u, v) to provide a more regular spatial sampling of energy locations (e.g. pixel aspect ratio). The angular sampling of the system assumes a defined target viewing volume location and additional propagated energy paths between two points at the optimized distance, given:

$$\text{Sample Distance} = \frac{\text{Inter-Outer Distance}}{(\text{Number of Desired Intermediate Samples} + 1)}$$

$$\text{Angular Sampling} = \operatorname{atan}\left(\frac{\text{Sample Distance}}{\text{Seating Distance}}\right)$$

In this case, the inter-ocular distance is leveraged to calculate the sample distance although any metric may be leveraged to account for appropriate number of samples as a given distance. With the above variables considered, approximately one ray per 0.57° may be desired and the total system resolution per independent sensory system may be determined, given:

$$\text{Locations Per Element}(N) = \frac{\text{Seating } FoV}{\text{Angular Sampling}}$$

$$\text{Total Resolution } H = N * \text{Horizontal Element Resolution}$$

$$\text{Total Resolution } V = N * \text{Vertical Element Resolution}$$

With the above scenario given the size of energy surface and the angular resolution addressed for the visual acuity system, the resultant energy surface may desirably include approximately 400 k×225 k pixels of energy resolution locations, or 90 gigapixels holographic propagation density. These variables provided are for exemplary purposes only and many other sensory and energy metrology considerations should be considered for the optimization of holographic propagation of energy. In an additional embodiment, 1 gigapixel of energy resolution locations may be desired based upon the input variables. In an additional embodiment, 1,000 gigapixels of energy resolution locations may be desired based upon the input variables.

Current Technology Limitations

Active Area, Device Electronics, Packaging, and the Mechanical Envelope

Figure 2:
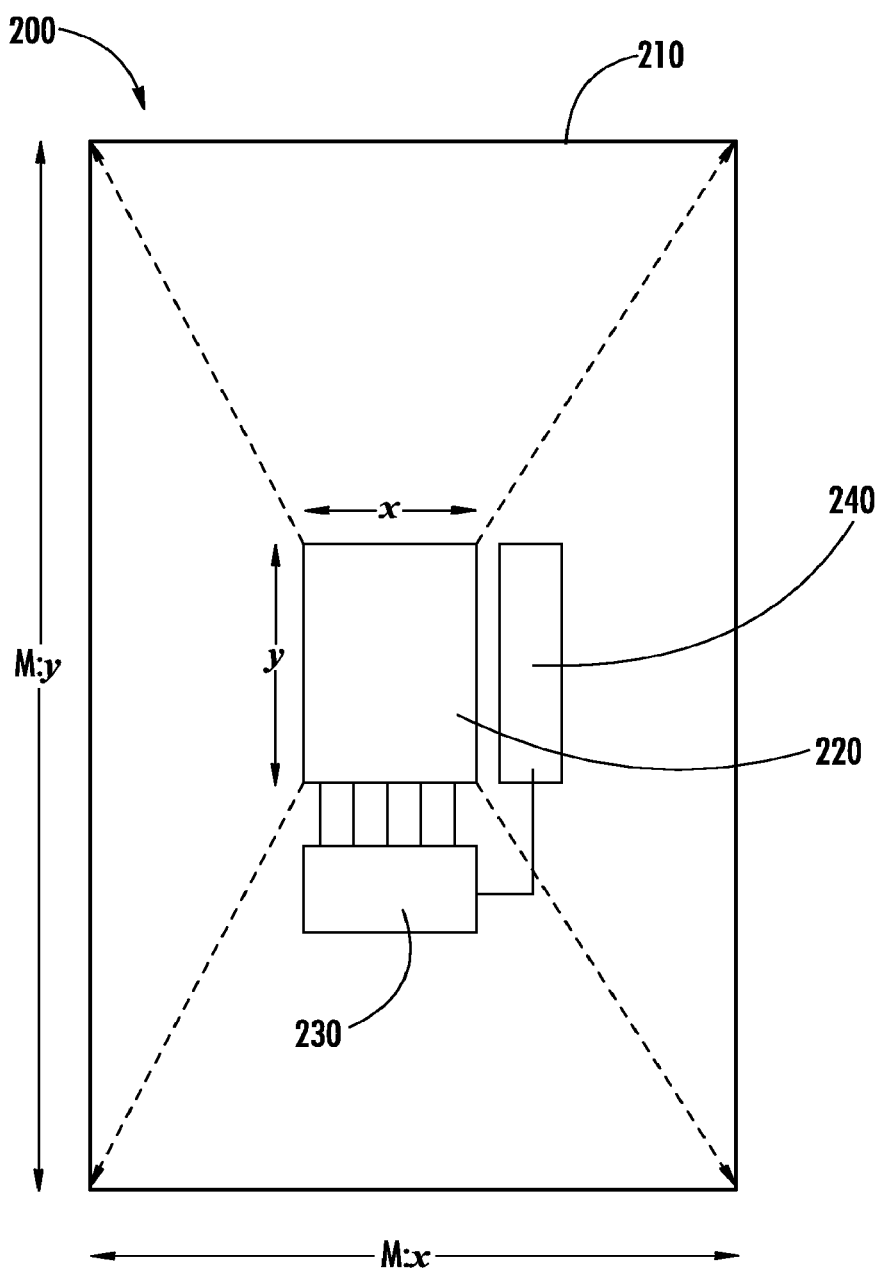
FIG. 2 is a schematic diagram illustrating an energy system having an active device area with a mechanical envelope.

FIG. 2 illustrates a device 200 having an active area 220 with a certain mechanical form factor. The device 200 may include drivers 230 and electronics 240 for powering and interface to the active area 220, the active area having a dimension as shown by the x and y arrows. This device 200 does not take into account the cabling and mechanical structures to drive, power and cool components, and the mechanical footprint may be further minimized by introducing a flex cable into the device 200. The minimum footprint for such a device 200 may also be referred to as a mechanical envelope 210 having a dimension as shown by the M:x and M:y arrows. This device 200 is for illustration purposes only and custom electronics designs may further decrease the mechanical envelope overhead, but in almost all cases may not be the exact size of the active area of the device. In an embodiment, this device 200 illustrates the dependency of electronics as it relates to active image area 220 for a micro OLED, DLP chip or LCD panel, or any other technology with the purpose of image illumination.

In some embodiments, it may also be possible to consider other projection technologies to aggregate multiple images onto a larger overall display. However, this may come at the cost of greater complexity for throw distance, minimum focus, optical quality, uniform field resolution, chromatic aberration, thermal properties, calibration, alignment, additional size or form factor. For most practical applications, hosting tens or hundreds of these projection sources 200 may result in a design that is much larger with less reliability.

For exemplary purposes only, assuming energy devices with an energy location density of 3840×2160 sites, one may determine the number of individual energy devices (e.g., device 100) desired for an energy surface, given:

$$\text{Devices } H = \frac{\text{Total Resolution } H}{\text{Device Resolution } H}$$

$$\text{Devices } V = \frac{\text{Total Resolution } V}{\text{Device Resolution } V}$$

Given the above resolution considerations, approximately 105×105 devices similar to those shown in FIG. 2 may be desired. It should be noted that many devices comprise of various pixel structures that may or may not map to a regular grid. In the event that there are additional sub-pixels or locations within each full pixel, these may be exploited to generate additional resolution or angular density. Additional signal processing may be used to determine how to convert the light field into the correct (u,v) coordinates depending on the specified location of the pixel structure(s) and can be an explicit characteristic of each device that is known and calibrated. Further, other energy domains may involve a different handling of these ratios and device structures, and those skilled in the art will understand the direct intrinsic relationship between each of the desired frequency domains. This will be shown and discussed in more detail in subsequent disclosure.

The resulting calculation may be used to understand how many of these individual devices may be desired to produce a full resolution energy surface. In this case, approximately 105×105 or approximately 11,080 devices may be desired to achieve the visual acuity threshold. The challenge and novelty exists within the fabrication of a seamless energy surface from these available energy locations for sufficient sensory holographic propagation.

Summary of Seamless Energy Surfaces

Configurations and Designs for Arrays of Energy Relays

In some embodiments, approaches are disclosed to address the challenge of generating high energy location density from an array of individual devices without seams due to the limitation of mechanical structure for the devices. In an embodiment, an energy propagating relay system may allow for an increase the effective size of the active device area to meet or exceed the mechanical dimensions to configure an array of relays and form a singular seamless energy surface.

Figure 3:
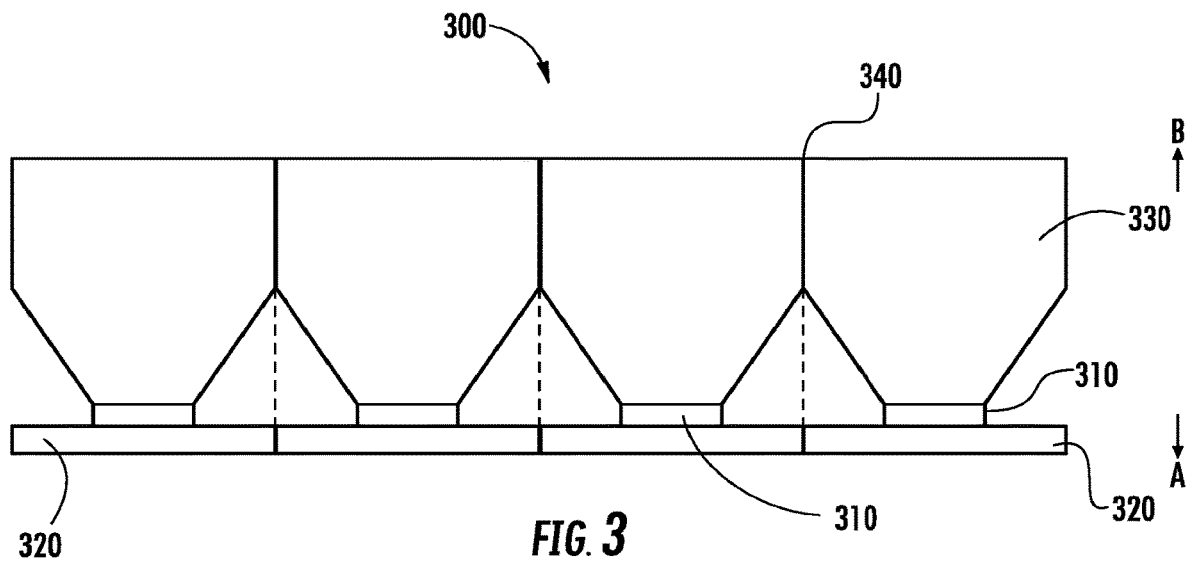
FIG. 3 is a schematic diagram illustrating an energy relay system.

FIG. 3 illustrates an embodiment of such an energy relay system 300. As shown, the relay system 300 may include a device 310 mounted to a mechanical envelope 320, with an energy relay element 330 propagating energy from the device 310. The relay element 330 may be configured to provide the ability to mitigate any gaps 340 that may be produced when multiple mechanical envelopes 320 of the device are placed into an array of multiple devices 310.

For example, if a device's active area 310 is 20 mm×10 mm and the mechanical envelope 320 is 40 mm×20 mm, an energy relay element 330 may be designed with a magnification of 2:1 to produce a tapered form that is approximately 20 mm×10 mm on a minified end (arrow A) and 40 mm×20 mm on a magnified end (arrow B), providing the ability to align an array of these elements 330 together seamlessly without altering or colliding with the mechanical envelope 320 of each device 310. Mechanically, the relay elements 330 may be bonded or fused together to align and polish ensuring minimal seam gap 340 between devices 310. In one such embodiment, it is possible to achieve a seam gap 340 smaller than the visual acuity limit of the eye.

Figure 4:
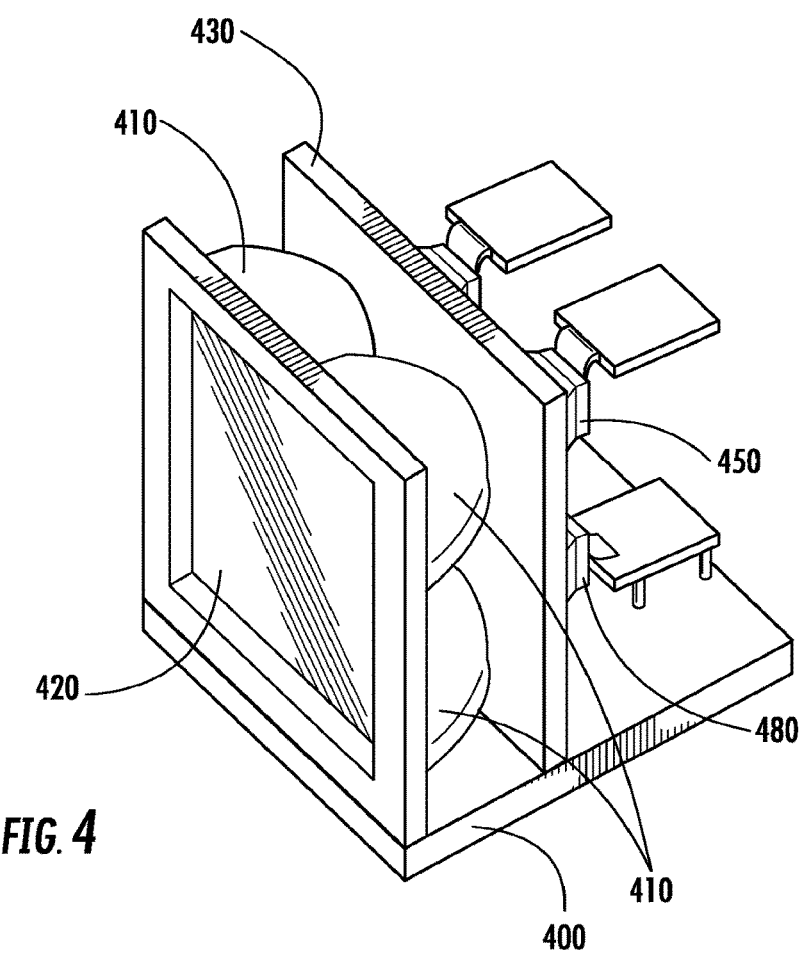
FIG. 4 is a schematic diagram illustrating an embodiment of energy relay elements adhered together and fastened to a base structure.

FIG. 4 illustrates an example of a base structure 400 having energy relay elements 410 formed together and securely fastened to an additional mechanical structure 430. The mechanical structure of the seamless energy surface 420 provides the ability to couple multiple energy relay elements 410, 450 in series to the same base structure through bonding or other mechanical processes to mount relay elements 410, 450. In some embodiments, each relay element 410 may be fused, bonded, adhered, pressure fit, aligned or otherwise attached together to form the resultant seamless energy surface 420. In some embodiments, a device 480 may be mounted to the rear of the relay element 410 and aligned passively or actively to ensure appropriate energy location alignment within the determined tolerance is maintained.

In an embodiment, the seamless energy surface comprises one or more energy locations and one or more energy relay element stacks comprise a first and second side and each energy relay element stack is arranged to form a singular seamless display surface directing energy along propagation paths extending between one or more energy locations and the seamless display surface, and where the separation between the edges of any two adjacent second sides of the terminal energy relay elements is less than the minimum perceptible contour as defined by the visual acuity of a human eye having better than 20/100 vision at a distance greater than the width of the singular seamless display surface.

In an embodiment, each of the seamless energy surfaces comprise one or more energy relay elements each with one or more structures forming a first and second surface with a transverse and longitudinal orientation. The first relay surface has an area different than the second resulting in positive or negative magnification and configured with explicit surface contours for both the first and second surfaces passing energy through the second relay surface to substantially fill a +/−10 degree angle with respect to the normal of the surface contour across the entire second relay surface.

In an embodiment, multiple energy domains may be configured within a single, or between multiple energy relays to direct one or more sensory holographic energy propagation paths including visual, acoustic, tactile or other energy domains.

In an embodiment, the seamless energy surface is configured with energy relays that comprise two or more first sides for each second side to both receive and emit one or more energy domains simultaneously to provide bidirectional energy propagation throughout the system.

In an embodiment, the energy relays are provided as loose coherent elements.

Introduction to Component Engineered Structures

Disclosed Advances in Transverse Anderson Localization Energy Relays

The properties of energy relays may be significantly optimized according to the principles disclosed herein for energy relay elements that induce Transverse Anderson Localization. Transverse Anderson Localization is the propagation of a ray transported through a transversely disordered but longitudinally consistent material.

This implies that the effect of the materials that produce the Anderson Localization phenomena may be less impacted by total internal reflection than by the randomization between multiple-scattering paths where wave interference can completely limit the propagation in the transverse orientation while continuing in the longitudinal orientation.

Of significant additional benefit is the elimination of the cladding of traditional multi-core optical fiber materials. The cladding is to functionally eliminate the scatter of energy between fibers, but simultaneously act as a barrier to rays of energy thereby reducing transmission by at least the core to clad ratio (e.g., a core to clad ratio of 70:30 will transmit at best 70% of received energy transmission) and additionally forms a strong pixelated patterning in the propagated energy.

Figure 5A:
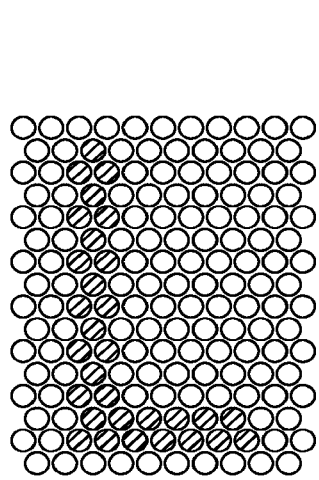
FIG. 5A is a schematic diagram illustrating an example of a relayed image through multi-core optical fibers.

FIG. 5A illustrates an end view of an example of one such non-Anderson Localization energy relay 500, wherein an image is relayed through multi-core optical fibers where pixilation and fiber noise may be exhibited due to the intrinsic properties of the optical fibers. With traditional multi-mode and multi-core optical fibers, relayed images may be intrinsically pixelated due to the properties of total internal reflection of the discrete array of cores where any cross-talk between cores will reduce the modulation transfer function and increase blurring. The resulting imagery produced with traditional multi-core optical fiber tends to have a residual fixed noise fiber pattern similar to those shown in FIG. 3.

Figure 5B:
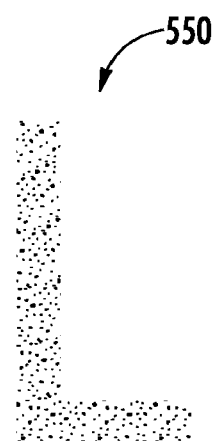
FIG. 5B is a schematic diagram illustrating an example of a relayed image through an energy relay that exhibits the properties of the Transverse Anderson Localization principle.

FIG. 5B, illustrates an example of the same relayed image 550 through an energy relay comprising materials that exhibit the properties of Transverse Anderson Localization, where the relayed pattern has a greater density grain structures as compared to the fixed fiber pattern from FIG. 5A. In an embodiment, relays comprising randomized microscopic component engineered structures induce Transverse Anderson Localization and transport light more efficiently with higher propagation of resolvable resolution than commercially available multi-mode glass optical fibers.

There is significant advantage to the Transverse Anderson Localization material properties in terms of both cost and weight, where a similar optical grade glass material, may cost and weigh upwards of 10 to 100-fold more than the cost for the same material generated within an embodiment, wherein disclosed systems and methods comprise randomized microscopic component engineered structures demonstrating significant opportunities to improve both cost and quality over other technologies known in the art.

In an embodiment, a relay element exhibiting Transverse Anderson Localization may comprise a plurality of at least two different component engineered structures in each of three orthogonal planes arranged in a dimensional lattice and the plurality of structures form randomized distributions of material wave propagation properties in a transverse plane within the dimensional lattice and channels of similar values of material wave propagation properties in a longitudinal plane within the dimensional lattice, wherein localized energy waves propagating through the energy relay have higher transport efficiency in the longitudinal orientation versus the transverse orientation.

In an embodiment, multiple energy domains may be configured within a single, or between multiple Transverse Anderson Localization energy relays to direct one or more sensory holographic energy propagation paths including visual, acoustic, tactile or other energy domains.

In an embodiment, the seamless energy surface is configured with Transverse Anderson Localization energy relays that comprise two or more first sides for each second side to both receive and emit one or more energy domains simultaneously to provide bidirectional energy propagation throughout the system.

In an embodiment, the Transverse Anderson Localization energy relays are configured as loose coherent or flexible energy relay elements.

Considerations for 4D Plenoptic Functions

Selective Propagation of Energy Through Holographic Waveguide Arrays

As discussed above and herein throughout, a light field display system generally includes an energy source (e.g., illumination source) and a seamless energy surface configured with sufficient energy location density as articulated in the above discussion. A plurality of relay elements may be used to relay energy from the energy devices to the seamless energy surface. Once energy has been delivered to the seamless energy surface with the requisite energy location density, the energy can be propagated in accordance with a 4D plenoptic function through a disclosed energy waveguide system. As will be appreciated by one of ordinary skill in the art, a 4D plenoptic function is well known in the art and will not be elaborated further herein.

The energy waveguide system selectively propagates energy through a plurality of energy locations along the seamless energy surface representing the spatial coordinate of the 4D plentopic function with a structure configured to alter an angular direction of the energy waves passing through representing the angular component of the 4D plenoptic function, wherein the energy waves propagated may converge in space in accordance with a plurality of propagation paths directed by the 4D plentopic function.

Figure 6:
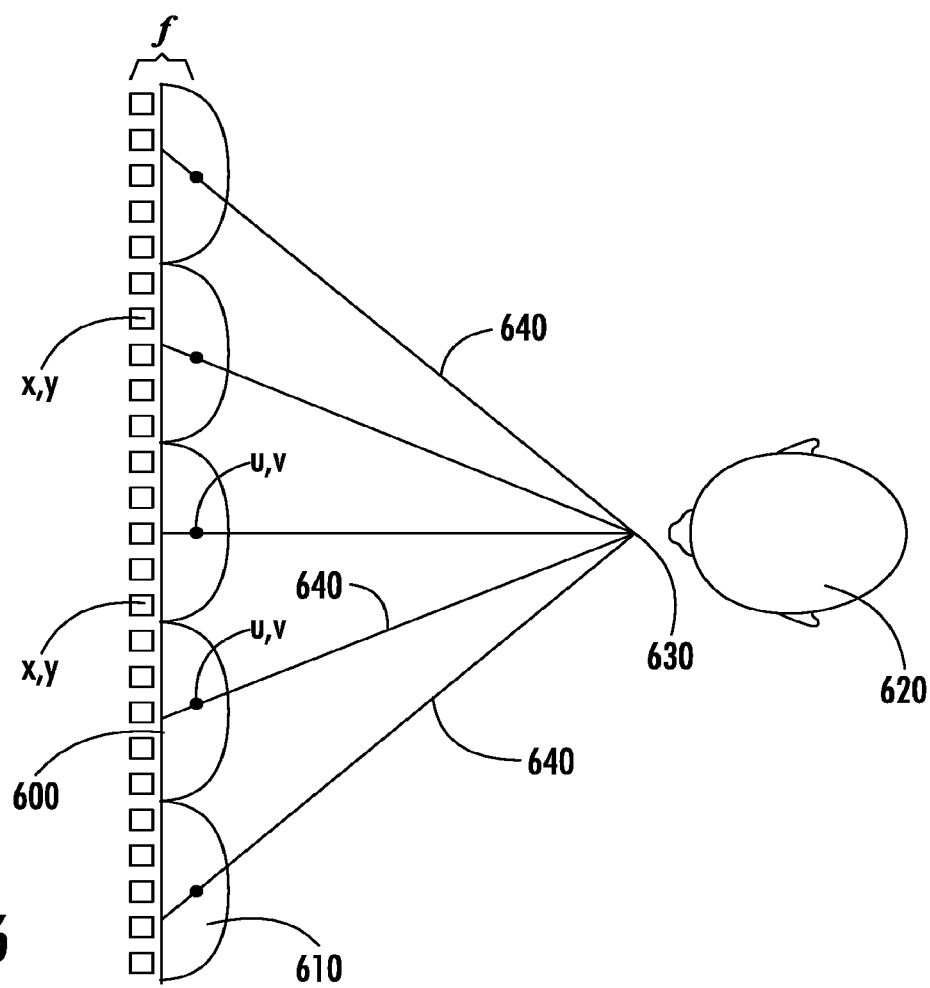
FIG. 6 is a schematic diagram showing rays propagated from an energy surface to a viewer.

Reference is now made to FIG. 6 illustrating an example of light field energy surface in 4D image space in accordance with a 4D plenoptic function. The figure shows ray traces of an energy surface 600 to a viewer 620 in describing how the rays of energy converge in space 630 from various positions within the viewing volume. As shown, each waveguide element 610 defines four dimensions of information describing energy propagation 640 through the energy surface 600. Two spatial dimensions (herein referred to as x and y) are the physical plurality of energy locations that can be viewed in image space, and the angular components theta and phi (herein referred to as u and v), which is viewed in virtual space when projected through the energy waveguide array. In general and in accordance with a 4D plenoptic function, the plurality of waveguides (e.g., lenslets) are able to direct an energy location from the x, y dimension to a unique location in virtual space, along a direction defined by the u, v angular component, in forming the holographic or light field system described herein.

However, one skilled in the art will understand that a significant challenge to light field and holographic display technologies arises from uncontrolled propagation of energy due designs that have not accurately accounted for any of diffraction, scatter, diffusion, angular direction, calibration, focus, collimation, curvature, uniformity, element crosstalk, as well as a multitude of other parameters that contribute to decreased effective resolution as well as an inability to accurately converge energy with sufficient fidelity.

In an embodiment, an approach to selective energy propagation for addressing challenges associated with holographic display may include energy inhibiting elements and substantially filling waveguide apertures with near-collimated energy into an environment defined by a 4D plenoptic function.

In an embodiment, an array of energy waveguides may define a plurality of energy propagation paths for each waveguide element configured to extend through and substantially fill the waveguide element's effective aperture in unique directions defined by a prescribed 4D function to a plurality of energy locations along a seamless energy surface inhibited by one or more elements positioned to limit propagation of each energy location to only pass through a single waveguide element.

In an embodiment, multiple energy domains may be configured within a single, or between multiple energy waveguides to direct one or more sensory holographic energy propagations including visual, acoustic, tactile or other energy domains.

In an embodiment, the energy waveguides and seamless energy surface are configured to both receive and emit one or more energy domains to provide bidirectional energy propagation throughout the system.

In an embodiment, the energy waveguides are configured to propagate non-linear or non-regular distributions of energy, including non-transmitting void regions, leveraging digitally encoded, diffractive, refractive, reflective, grin, holographic, Fresnel, or the like waveguide configurations for any seamless energy surface orientation including wall, table, floor, ceiling, room, or other geometry based environments. In an additional embodiment, an energy waveguide element may be configured to produce various geometries that provide any surface profile and/or tabletop viewing allowing users to view holographic imagery from all around the energy surface in a 360-degree configuration.

In an embodiment, the energy waveguide array elements may be reflective surfaces and the arrangement of the elements may be hexagonal, square, irregular, semi-regular, curved, non-planar, spherical, cylindrical, tilted regular, tilted irregular, spatially varying and/or multi-layered.

For any component within the seamless energy surface, waveguide, or relay components may include, but not limited to, optical fiber, silicon, glass, polymer, optical relays, diffractive, holographic, refractive, or reflective elements, optical face plates, energy combiners, beam splitters, prisms, polarization elements, spatial light modulators, active pixels, liquid crystal cells, transparent displays, or any similar materials exhibiting Anderson localization or total internal reflection.

Realizing the Holodeck

Aggregation of Seamless Energy Surface Systems To Stimulate Human Sensory Receptors Within Holographic Environments It is possible to construct large-scale environments of seamless energy surface systems by tiling, fusing, bonding, attaching, and/or stitching multiple seamless energy surfaces together forming arbitrary sizes, shapes, contours or form-factors including entire rooms. Each energy surface system may comprise an assembly having a base structure, energy surface, relays, waveguide, devices, and electronics, collectively configured for bidirectional holographic energy propagation, emission, reflection, or sensing.

In an embodiment, an environment of tiled seamless energy systems are aggregated to form large seamless planar or curved walls including installations comprising up to all surfaces in a given environment, and configured as any combination of seamless, discontinuous planar, faceted, curved, cylindrical, spherical, geometric, or non-regular geometries.

In an embodiment, aggregated tiles of planar surfaces form wall-sized systems for theatrical or venue-based holographic entertainment. In an embodiment, aggregated tiles of planar surfaces cover a room with four to six walls including both ceiling and floor for cave-based holographic installations. In an embodiment, aggregated tiles of curved surfaces produce a cylindrical seamless environment for immersive holographic installations. In an embodiment, aggregated tiles of seamless spherical surfaces form a holographic dome for immersive Holodeck-based experiences.

In an embodiment, aggregated tiles of seamless curved energy waveguides provide mechanical edges following the precise pattern along the boundary of energy inhibiting elements within the energy waveguide structure to bond, align, or fuse the adjacent tiled mechanical edges of the adjacent waveguide surfaces, resulting in a modular and seamless energy waveguide system.

In a further embodiment of an aggregated tiled environment, energy is propagated bidirectionally for multiple simultaneous energy domains. In an additional embodiment, the energy surface provides the ability to both display and capture simultaneously from the same energy surface with waveguides designed such that light field data may be projected by an illumination source through the waveguide and simultaneously received through the same energy surface. In an additional embodiment, additional depth sensing and active scanning technologies may be leveraged to allow for the interaction between the energy propagation and the viewer in correct world coordinates. In an additional embodiment, the energy surface and waveguide are operable to emit, reflect or converge frequencies to induce tactile sensation or volumetric haptic feedback. In some embodiments, any combination of bidirectional energy propagation and aggregated surfaces are possible.

In an embodiment, the system comprises an energy waveguide capable of bidirectional emission and sensing of energy through the energy surface with one or more energy devices independently paired with two-or-more-path energy combiners to pair at least two energy devices to the same portion of the seamless energy surface, or one or more energy devices are secured behind the energy surface, proximate to an additional component secured to the base structure, or to a location in front and outside of the FOV of the waveguide for off-axis direct or reflective projection or sensing, and the resulting energy surface provides for bidirectional transmission of energy allowing the waveguide to converge energy, a first device to emit energy and a second device to sense energy, and where the information is processed to perform computer vision related tasks including, but not limited to, 4D plenoptic eye and retinal tracking or sensing of interference within propagated energy patterns, depth estimation, proximity, motion tracking, image, color, or sound formation, or other energy frequency analysis. In an additional embodiment, the tracked positions actively calculate and modify positions of energy based upon the interference between the bidirectional captured data and projection information.

In some embodiments, a plurality of combinations of three energy devices comprising an ultrasonic sensor, a visible electromagnetic display, and an ultrasonic emitting device are configured together for each of three first relay surfaces propagating energy combined into a single second energy relay surface with each of the three first surfaces comprising engineered properties specific to each device's energy domain, and two engineered waveguide elements configured for ultrasonic and electromagnetic energy respectively to provide the ability to direct and converge each device's energy independently and substantially unaffected by the other waveguide elements that are configured for a separate energy domain.

In some embodiments, disclosed is a calibration procedure to enable efficient manufacturing to remove system artifacts and produce a geometric mapping of the resultant energy surface for use with encoding/decoding technologies as well as dedicated integrated systems for the conversion of data into calibrated information appropriate for energy propagation based upon the calibrated configuration files.

In some embodiments, additional energy waveguides in series and one or more energy devices may be integrated into a system to produce opaque holographic pixels.

In some embodiments, additional waveguide elements may be integrated comprising energy inhibiting elements, beam-splitters, prisms, active parallax barriers or polarization technologies in order to provide spatial and/or angular resolutions greater than the diameter of the waveguide or for other super-resolution purposes.

In some embodiments, the disclosed energy system may also be configured as a wearable bidirectional device, such as virtual reality (VR) or augmented reality (AR). In other embodiments, the energy system may include adjustment optical element(s) that cause the displayed or received energy to be focused proximate to a determined plane in space for a viewer. In some embodiments, the waveguide array may be incorporated to holographic head-mounted-display. In other embodiments, the system may include multiple optical paths to allow for the viewer to see both the energy system and a real-world environment (e.g., transparent holographic display). In these instances, the system may be presented as near field in addition to other methods.

In some embodiments, the transmission of data comprises encoding processes with selectable or variable compression ratios that receive an arbitrary dataset of information and metadata; analyze said dataset and receive or assign material properties, vectors, surface IDs, new pixel data forming a more sparse dataset, and wherein the received data may comprise: 2D, stereoscopic, multi-view, metadata, light field, holographic, geometry, vectors or vectorized metadata, and an encoder/decoder may provide the ability to convert the data in real-time or off-line comprising image processing for: 2D; 2D plus depth, metadata or other vectorized information; stereoscopic, stereoscopic plus depth, metadata or other vectorized information; multi-view; multi-view plus depth, metadata or other vectorized information; holographic; or light field content; through depth estimation algorithms, with or without depth metadata; and an inverse ray tracing methodology appropriately maps the resulting converted data produced by inverse ray tracing from the various 2D, stereoscopic, multi-view, volumetric, light field or holographic data into real world coordinates through a characterized 4D plenoptic function. In these embodiments, the total data transmission desired may be multiple orders of magnitudes less transmitted information than the raw light field dataset.

Overview of a 4D Plenoptic Energy Directing System Architecture

Figure 7:
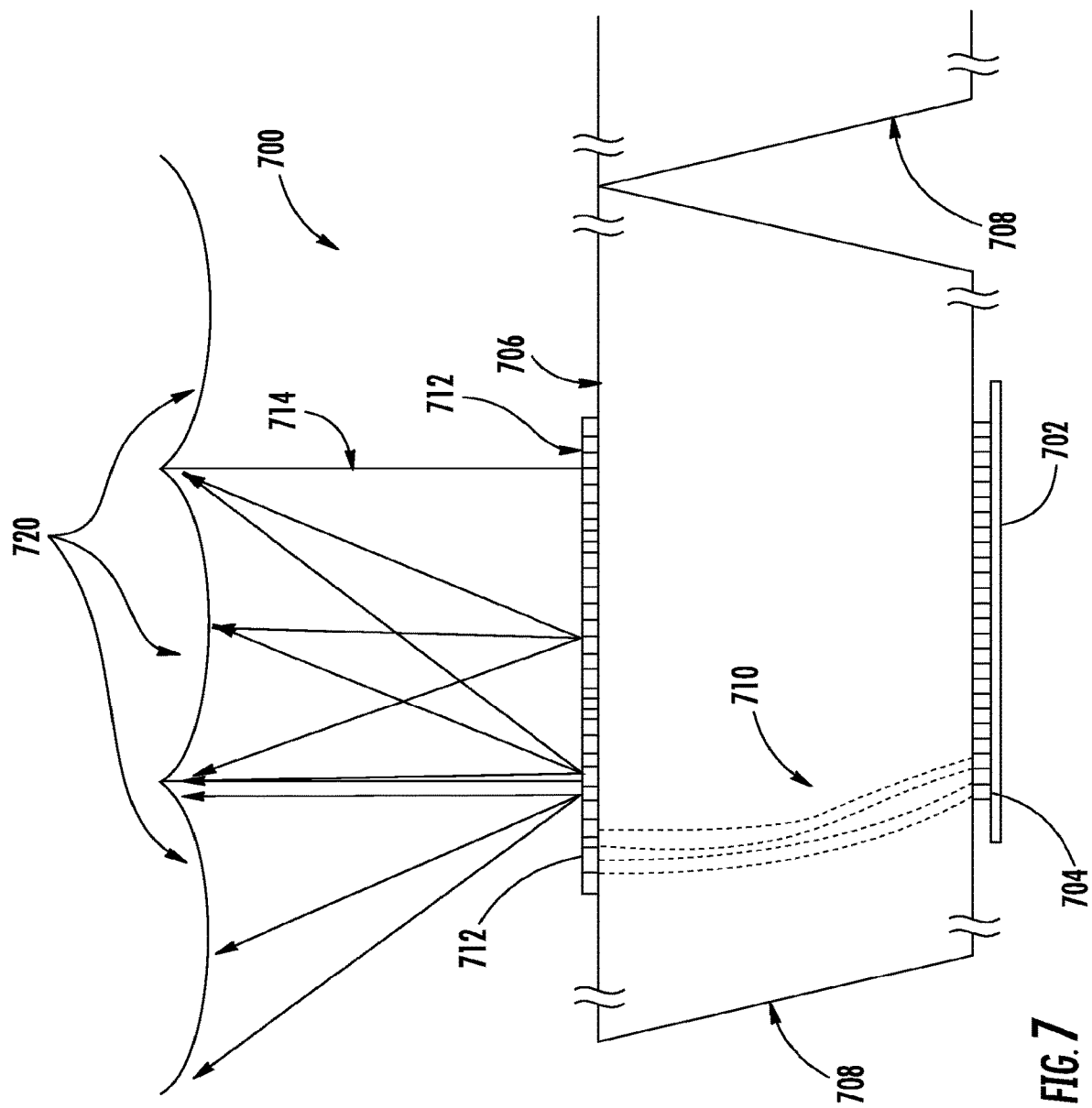
FIG. 7 is a schematic diagram illustrating a system architecture operable to direct energy according to a four-dimensional plenoptic function.

FIG. 7 shows an overview of the architecture of one embodiment of a four-dimensional (4D) plenoptic energy directing system 700. The energy directing system 700 may include one or more energy devices 702 such as an LCD, a LED, or an OLED which may include energy locations 704 that are on a regular grid. Energy from energy location 704 may be directed to energy locations 712 on an energy surface 706 through an energy relay element 708, which can include, but is not limited to, a tapered energy relay, a flexible energy relay, or a faceplate, each of which may operate on the principle of Anderson Transverse Localization in some embodiments. The energy system 700 may include a mosaic of these energy devices 702 and relay elements 708. Each relay element 708 may introduce a unique distortion 710, such as warping, so that a regular grid pattern on the energy device plane is no longer regular on the energy surface 706. Above energy surface 706, the energy system 700 may further include an array of energy waveguides 720. In an embodiment for visible electromagnetic energy, the array of the energy waveguides 720 may be an array of lenses. The energy locations 704 in the energy device 702 may have relayed energy locations 712 on the energy surface 706 as defined by its (x, y) coordinates on the energy surface. The energy system 700 may further include an inhibiting element 714 for inhibiting propagation of energy. The inhibiting element 714 and the energy waveguide array 720 may cooperate such that the energy locations 712 each may have an uninhibited propagation path through a waveguide array location (x, y). The uninhibited propagation path of the energy locations 712 may be characterized by path angle defined by angular coordinates (u, v), and a collimated energy wave may propagate along the uninhibited propagation path at angular coordinate (u, v). Together, the four parameters (x, y, u, v)—the waveguide locations and the angular coordinate of propagation paths through the waveguide elements—define a 4D plenoptic coordinate system. One of the goals of calibration is to determine the 4D parameters for each energy location 712 as precisely as possible.

Overview of the Calibration Procedure

Figure 8:
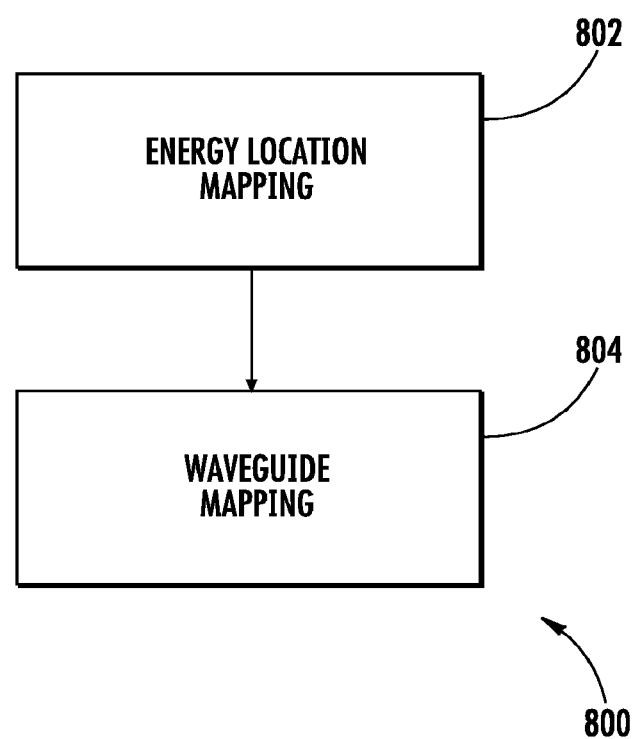
FIG. 8 is a flow diagram illustrating process for mapping the energy locations and energy propagation paths for a four-dimensional plenoptic energy directing system.

FIG. 8 is a flow chart diagram illustrating an embodiment of a calibration process 800, which may include an energy location mapping process 802 and a waveguide mapping process 804. In an embodiment, the energy location mapping process 802 may include a calibration for the relay element 708 without the waveguides 720. The energy location mapping process 802 may define the real-world coordinate (x, y) in physical space for each energy location 704 on the energy surface 706. The energy location mapping process 802 may also define a mapping between each energy location 712 on the energy surface 706 and each energy location 704 on the energy source device 702. In an embodiment, the energy location mapping process 802 may remove any distortion or artifacts 710 that the relay element 708 may introduce. In an embodiment, the energy location mapping process 802 may include two steps: a coarse one and a fine one. In the coarse step, each individual energy relay of the light field mosaic (referred to as a tile) is analyzed, and an overall mapping between the energy surface 706 for that tile and the corresponding energy device 702 is determined. During the fine step, smaller but more detailed portions of each tile are analyzed at a time, and the mapping between the energy surface 706 and the energy device 702 is made much more precise. In an embodiment, energy location mapping process 802 may also include applying a gain map for each relay element tile, and adjusting the overall energy intensity of each relay element tile to match all the others in the energy system 700. In an embodiment, the waveguide array mapping process 804 of the calibration process 800 may be carried out after the energy location mapping process 802, and after the energy waveguides 720 are aligned and secured. The waveguide array mapping process 804 may define the energy propagation path angle for the energy that propagates through each energy location generally under the energy waveguides 720. The waveguide mapping process 804 may yield correct (u, v) angular coordinates for each energy location 712. In an embodiment, this calibration procedure may involve locating the energy location 712 under a center of each waveguide 720 and assigning energy location 712 under each waveguide 720 the appropriate (u, v) angular coordinate, and finally validating and refining these (u, v) assignments through direct measurements and interpolation.

Overview of the Calibration Setup for Energy Locations

Figure 9:
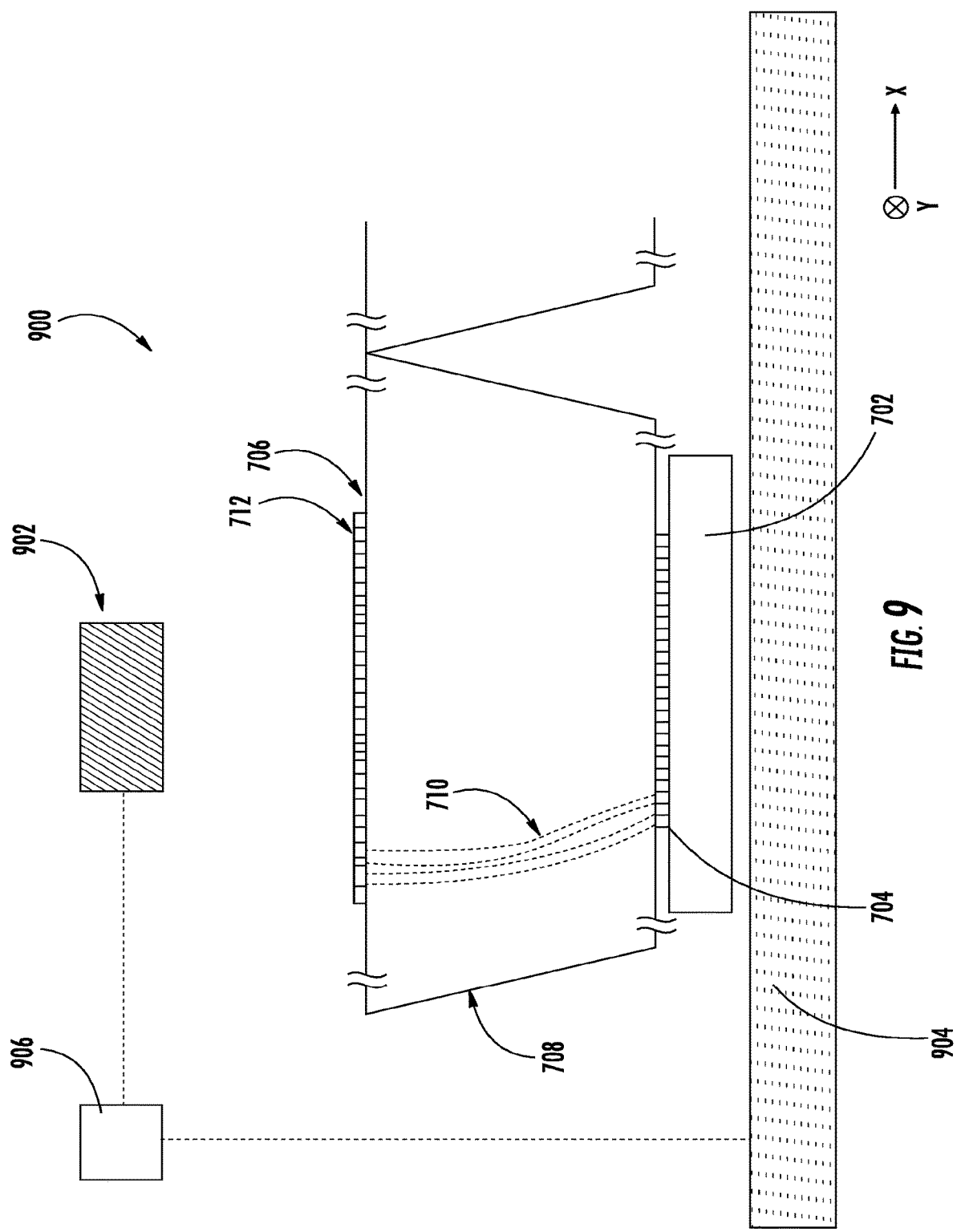
FIG. 9 is a schematic diagram illustrating a calibration system for calibrating an energy relay element in a four-dimensional plenoptic energy directing system.

FIG. 9 is a schematic of a calibration system 900 for the energy location mapping process 802. In an embodiment, the calibration system 900 may include an energy senor 902. The energy senor 902 may be any device that is configured to receive energy from the energy device 702 and relay element 708. For example, the energy senor 902 may include a camera, a line scanning device, a plurality of pressure sensors disposed in a spatial array, or a plurality of acoustic sensors disposed in a spatial array. In an embodiment, the energy sensor 902 may include a commercial camera having greater than 20 MPix that can be remotely operated via a computer for automated data gathering. In an embodiment, the sensor size of the energy sensor 902 may be chosen to be about the size of the energy surface 706 side of an individual relay element 708, and the number of pixels in each dimension in a horizontal plane may be chosen to be larger than the number of energy locations 712 or 704. In an embodiment, the energy sensor may include a macro lens focused onto the energy surface 706, and providing an imaging field of view that is 10% larger than the energy surface 706 side of an individual relay element 708, so that it images the entire relay element tile. The energy system 700 may be mounted onto a motorized movable platform 904 of the calibration system 900, which moves the energy system 700 underneath the energy sensor 902 in x and y coordinates parallel to the energy surface 706. In an embodiment, the calibration system 900 may further include a controller module 906 in electrical communication with the energy sensor 902 and the movable platform 904 so that the movable platform 904 can be controlled by the controller module 906 to move remotely for the purpose of automation.

In an embodiment, the energy system 700 may be mounted on a tilt stage that has two degrees of freedom, and allows the adjustment of the energy surface 706 so that it is coplanar with the plane of motion of the movable platform 904. The tilt may be adjusted by trial and error until the entire energy surface 706 remains in focus despite the shallow depth of field of an objective lens in an embodiment of the optics for the energy sensor 902.

The energy location mapping process 802 may allow for mapping between the real-world coordinates of the energy locations 712 and the digital coordinates of the energy locations 704 in the energy device 702.

Figure 10:
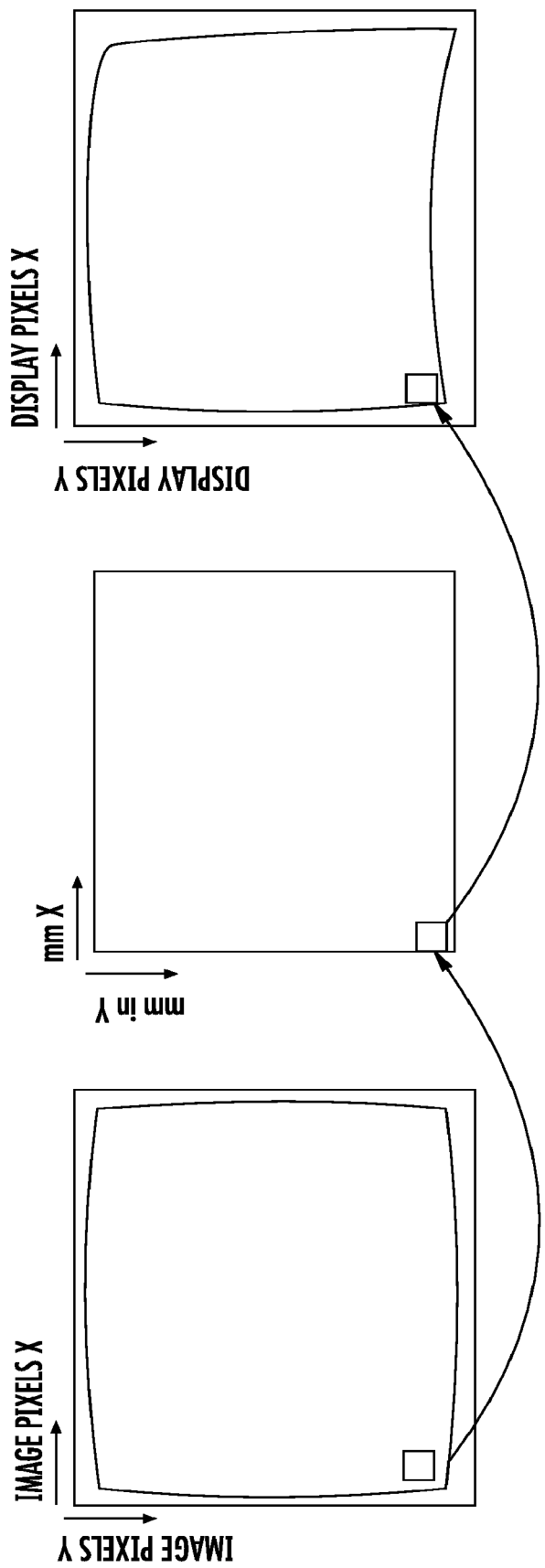
FIGS. 10A-C are embodiments of mappings in the process of FIG. 8.

One approach for doing so is to first capture data with a first reference pattern placed on the energy surface 706 using the energy sensor 902. The resulting data of the reference pattern is in the digital space of the sensor, with a known reference pattern in the plane of the energy surface 706. FIG. 10A shows the outline of the energy surface 706 for the energy relay as recorded in the digital space of the sensor 902. The sensor data may contain the boundaries of a particular relay mosaic tile. Although the tile illustrated in FIG. 10A is rectangular, the image of the tile may have subtle distortions such as a pin-cushion distortion. FIG. 10B shows the actual real-world coordinates of the energy surface 706 defined in a physical reference space. Using features of the reference pattern, it is possible to create a map between the sensor coordinates defined in the digital reference space and the real-world coordinates on surface 706. For ease of reference, this map is referred to herein as "Map 1." In an embodiment, Map 1 translates digital sensor coordinates into real-world coordinates in units of length (for example, mm).

In an embodiment, after removing the first reference pattern, a second reference pattern may be present at energy locations 702 on the energy source device 702. This will result in this second reference pattern being relayed to the first surface 706. The relay element 708 may warp the second reference pattern as it is relayed to surface 706. Once again, sensor data for this second reference pattern may be recorded in a digital reference space. At this point, Map 1 may be applied to the digital sensorcoordinates to translate this second reference pattern into real-world coordinates in the physical reference space. In an embodiment, through feature detection, and by knowing the second reference pattern present on source device 702, it is possible to map the real-world coordinates of surface 706 into the digital coordinates of the energy source plane 702, generating a map that is referred to herein as "Map 2." In an embodiment, Map 2 translates the (x, y) coordinates of energy surface 706 into the digital coordinates of energy source plane 702. This forward mapping has a paired reverse mapping. FIG. 10C shows the energy surface 706 in digital coordinates of the energy source plane 702, with an outline of the energy source plane coordinates that map to the physical edges of the surface of the relay 706.

Figure 11:
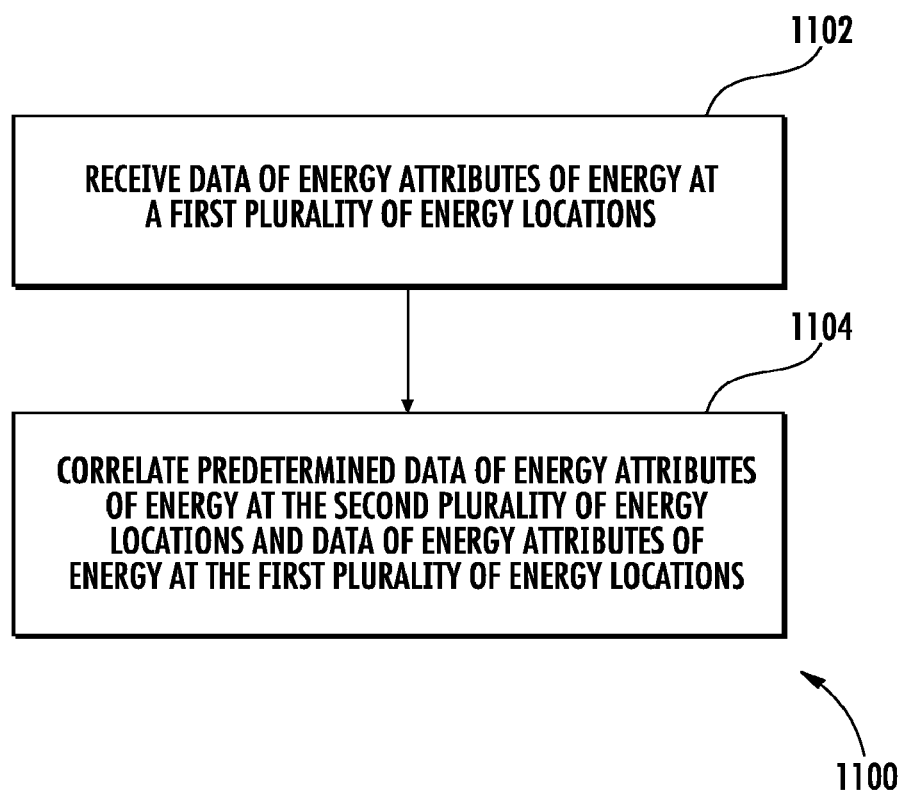
FIG. 11 is a flow diagram illustrating an embodiment of a process for mapping the energy locations.

FIG. 11 is a flow chart diagram illustrating an embodiment of an energy location mapping process 1100. The mapping process 1100 may include a step 1102 in which data is received for energy attributes of energy at the first plurality of energy locations 712 at the first surface 706 of the energy relay element 708. Energy at the first plurality of energy locations 712 was relayed from a second plurality of energy locations 704 through the energy relay element 708 along the longitudinal orientation of the relay element 708. The mapping process 1100 may further include a step 1104 in which predetermined data of energy attributes of energy at the second plurality of energy locations 704 and the data of energy attributes of energy at the first plurality of energy locations 712 are correlated to create a calibrated relay function that includes a mapping of the energy attributes at the first plurality of energy locations 712 to the energy attributes at the second plurality of energy 704. It is to be appreciated that the energy attributes being correlated and mapped in step 1104 may include at least one energy attribute selected from a group consisting of position, color, intensity, frequency, amplitude, contrast, and resolution. In an embodiment, the calibration mapping may be applied to compensate for at least one relay attribute selected from a group consisting of: an intensity variation, a color variation, an attenuating region, and a spatial distortion.

In an embodiment, the energy attributes at the first plurality of energy locations 712 may include at least position coordinates defined in a physical reference space, and the energy attributes at the second plurality of energy locations 704 may include at least position coordinates defined in a first digital reference space. For example, the first digital reference space may be defined by the energy locations 704 in the energy device 702. In an embodiment where the energy device 702 comprises a display, the pixels of the display may define a digital "pixel" reference space. In an embodiment, the position coordinates defined in the physical reference space may be converted from a second digital reference space using a conversion function. The second digital space may be defined by sensing units in the sensor 902. For example, the data captured by a senor 902 may include captured pixel locations in the data, and a conversion function of captured pixel locations to physical measurements in the real world may be used to convert energy attributes at the first plurality of energy locations 712 in physical measurements.

In an embodiment, the data of attributes of energy at the first plurality of energy locations 712 may be generated by the energy sensor 902 capturing energy from first plurality of energy locations 712. In an embodiment, the energy sensor 902 may be configured to receive an operating parameter of the energy sensor 902 from the controller 906, which may be programmed to operate the energy sensor 902 according to a predetermined instruction. In an embodiment, the operating parameter may be provided in a digital signal from the controller 906. In an embodiment, the operating parameter may include position instruction where the controller 906 is programmed to position the sensor 902 according to the predetermined instruction.

In an embodiment, data of attributes of energy at the first plurality of energy locations 712 may be generated by positioning the movable platform 904 on which the energy relay element 708 is located, and by operating the energy sensor 902 to capture energy from first plurality of energy locations 712 when the energy relay element 708 is located at a predetermined position. In an embodiment, the movable platform 904 and the sensor 902 are configured to receive digital signals from the controller 906, which may be programmed to operate the energy sensor 902 and the movable platform 904 according to a predetermined instruction. In an embodiment, the digital signals may comprise position instructions for the energy sensor 902 and the movable platform 904, and the controller 906 is programmed to position the energy sensor 902 and movable platform 904 according to the predetermined instruction.

Figure 12:
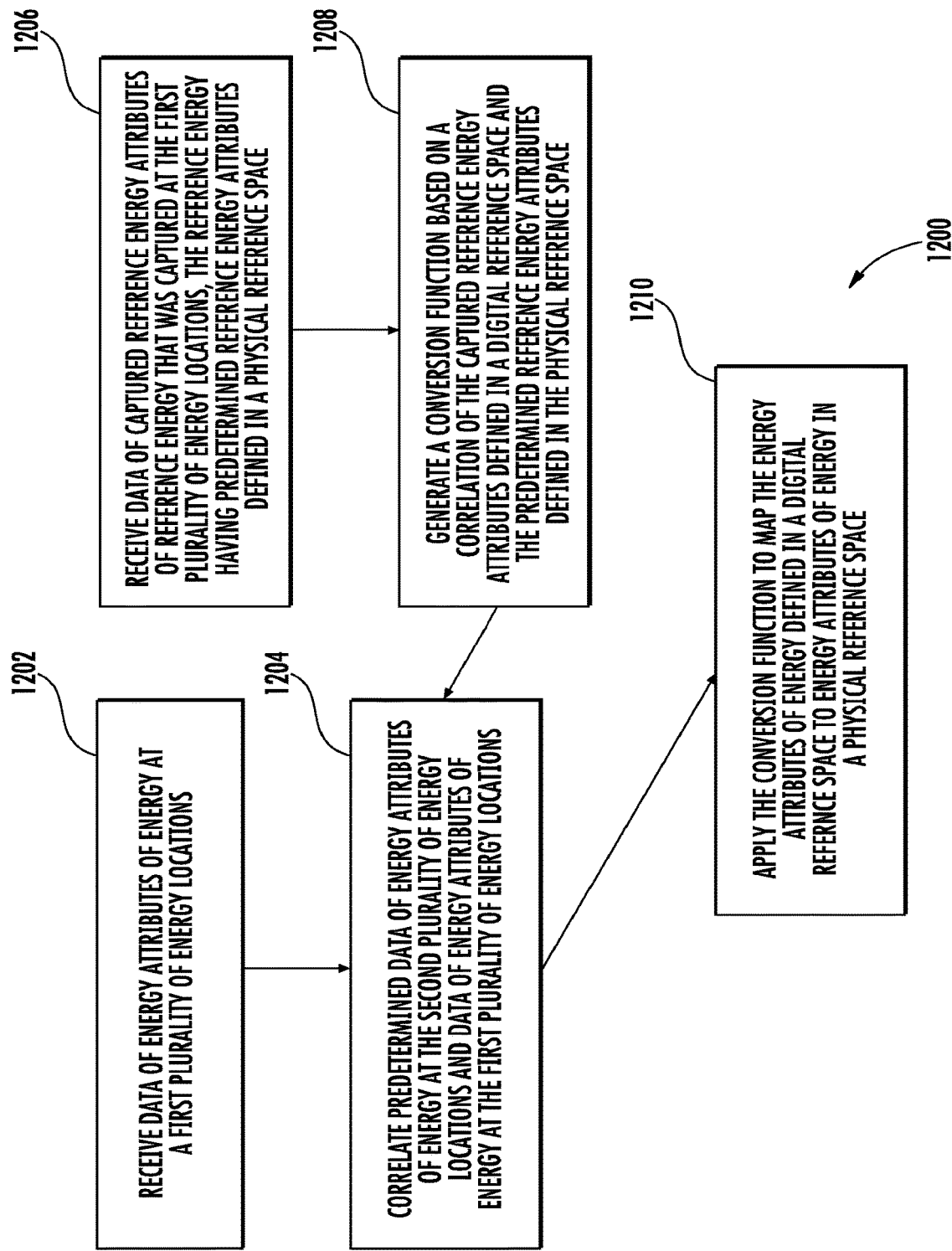
FIG. 12 is a flow diagram illustrating another embodiment of a process for mapping the energy locations.

FIG. 12 is a flow chart diagram illustration of an embodiment of an energy location mapping process 1200 that uses a conversion function to convert energy attributes in a digital space to energy attributes in a physical space. The mapping process 1200 may include a step 1206 in which data is received for captured reference energy attributes of reference energy that was captured at the first plurality of energy locations 712 at the first surface 706 of the energy relay element 708. The reference energy may have predetermined reference energy attributes defined in a physical reference space, e.g., a real word measurement. The predetermined reference energy attributes may include at least one energy attribute selected from a group consisting of position, color, intensity, frequency, amplitude, contrast, and resolution. In an embodiment, the reference energy forms a reference spatial pattern and further wherein the reference energy captured at the first plurality of energy locations 712 at the first surface 706 forms a captured pattern. In an embodiment, position attributes of the reference spatial pattern are known in the physical reference space.

In an embodiment, the mapping process 1200 may include a step 1208 in which a conversion function is generated by correlating the predetermined reference energy attributes defined in the physical reference space to the captured reference energy attributes in a digital reference space. In an embodiment, this mapping is similar to Map 1 above, which translated image pixel coordinates into real-world coordinates in units of length (for example, mm), and is the mapping shown between FIG. 10A and FIG. 10B.

The mapping process 1200 may include a step 1202 in which digital data is received for energy attributes of energy at the first plurality of energy locations 712 at the first surface 706 of the energy relay element 708. Energy at the first plurality of energy locations 712 was relayed from a second plurality of energy locations 704 through the energy relay element 708 along the longitudinal orientation of the relay element 708. The mapping process 1200 may further include a step 1204 in which the conversion function generated in step 1208 is applied to the digital data received in step 1202, in order to map the energy attributes of energy defined in the digital reference space to energy attributes in a physical reference space.

In an embodiment, the mapping process 1200 may further include a step 1210 which generates a mapping between the energy attributes at the first plurality of energy locations 712 as defined in a physical reference space to the energy attributes at the second plurality of energy locations 704 as defined in a digital reference space. In an embodiment, this mapping is similar to Map 2 above, which translated real-world coordinates in units of length (for example, mm), into energy source digital pixel coordinates, and is the mapping shown between FIG. 10B and FIG. 10C.

Example Implementation 1

For the purpose of illustrating the principles of the present disclosure, an example of implementing embodiments of the mapping processes 1100 and 1200 is provided below with respect to a display system with a display surface and pixels of illumination sources that may provide an image to the display surface. It is to be appreciated that other implementations in accordance with the principles of the present disclosure may be carried out for other types of energy systems, such as acoustic, infrared, ultraviolet, microwave, x-ray, electro-magnetic, optical-mechanical, or tactile energy system.

1. Place a high-resolution reference checkerboard chart directly on the display surface. This is a reference grid with a known pitch used to calibrate real-world coordinates, and is printed on a transparent medium such as Mylar or glass. The dark portions of the chart should be opaque to light, while the light portions of the chart should be optically transparent. If the checkerboard chart adds any path length, for example, from a thickness of glass, then a compensating path length must be also included during imaging of the display surface without this chart. In at least one embodiment, the pitch of the reference checkerboard is 125 um.

2. Capture an image of this chart for each tile of the optical relay mosaic, or if there are no tiles, for each portion of the display that matches the camera's FOV with some small neighboring frame overlap. The checkerboard chart should be backlit by uniformly lighting the energy source plane. Move the display under the camera with the translation stage shown in FIG. 2.

3. Identify the reference checkerboard grid pattern.

4. Generate Map 1 from the image space to real-world coordinates. This calibrates distance, and removes distortion due to the lens or imperfect camera alignment. This mapping should be applied to every subsequent calibration image from this point forward.

5. Remove the high-resolution checkerboard chart placed on the display surface.

6. Capture a white image of a single tile of the optical relay mosaic while it is uniformly illuminated.

7. Perform edge detection on this white image to determine the borders of the optical relay tile.

8. Calculate the rotation of the optical relay tile in the image, and apply the reverse rotation in order to have the optical relay tile boundaries unrotated and rectilinear with the image boundaries.

9. Place a known checkerboard pattern onto the energy source plane. In at least one embodiment, the checkerboard squares are each 4 to 12 pixels wide. The checkerboard pattern on the display surfaced may have optical distortions after travelling through the optical relay, if one exists.

10. Capture the image of the optical relay tile, and divide it pixel-by-pixel with the white image in order to remove (normalize) any blemishes or intensity variation across the optical relay.

11. Convert this image to real-world coordinates by applying Map 1.

12. Identify the grid pattern of the checker board image, as well as the boundaries of the optical mosaic tile 13. Apply MAP 1 to this image to determine the real-world coordinates of the grid pattern on the display surface 14. Determine the mapping Map 2 from the display surface real-world coordinates to the illumination engine pixel coordinates. This mapping may use at least one offset pixel reference location for the illumination source display for a known location on the display surface, such as the top-left corner.

15. The two mappings Map 1 and Map 2 are now identified.

16. If the display surface is composed of an optical relay tile, then each tile should be photographed with a uniform white image. Then the average illumination can be determined, and the overall illumination for each tile can be adjusted to achieve a uniform display surface.

Overview of 4D Calibration

The above discussed energy location calibration may define the mapping between real-world coordinates for the energy surface 706 and the coordinates for the energy locations 704 in the energy device 702. This energy location calibration may be performed without the energy waveguide array 720. 4D calibration may define the angular coordinates for the energy propagation path for each energy locations 712 once the waveguides 720 has been installed. An objective of a 4D calibration process may be to define the 4D plenoptic coordinates (x,y,u,v) for every energy location 712.

Figure 13:
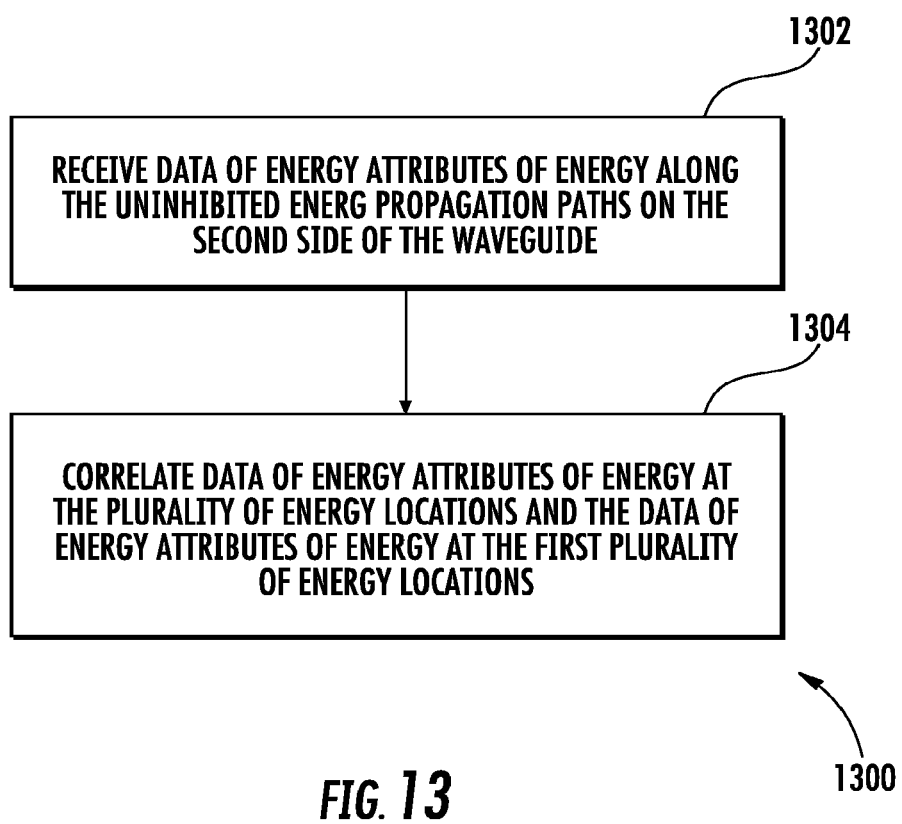
FIG. 13 is a flow diagram illustrating an embodiment of a process for mapping the energy locations and energy propagation paths for a four-dimensional plenoptic energy directing system.
Figure 14:
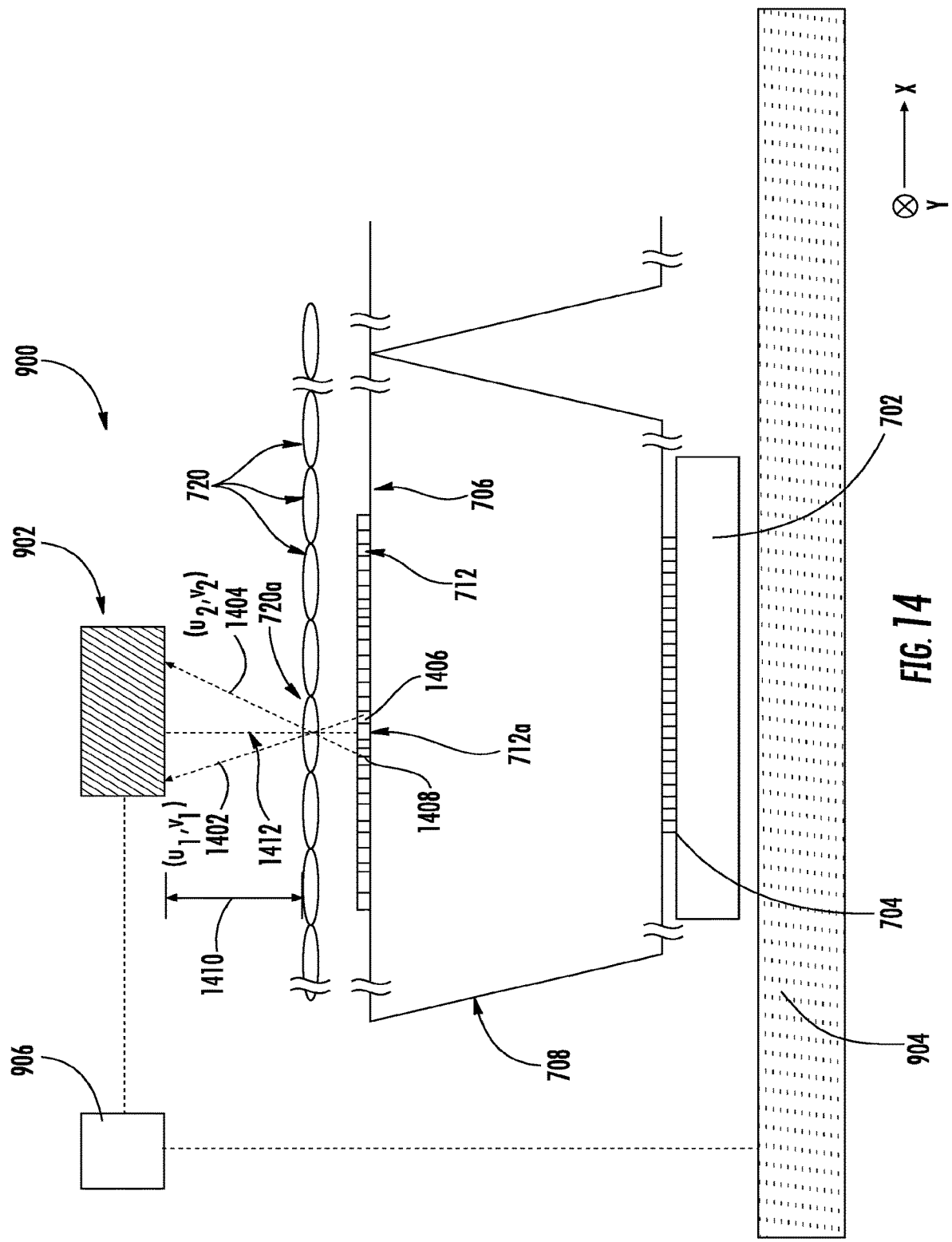
FIG. 14 is a schematic diagram illustrating a calibration system for calibrating an energy waveguide element in a four-dimensional plenoptic energy directing system.

Referring to FIGS. 13 and 14, in an embodiment, an energy waveguide element 720a may be operable to direct energy along uninhibited energy propagation paths 1402 and 1404 extending from a first side to a second side of the energy waveguide element 720a. The uninhibited energy propagation paths 1402 and 1404 may extend, on the first side, to a plurality of energy locations 1406, 1408, respectively, and extend, on the second side, along different angular directions $(u_1, v_1)$, $(u_2, v_2)$ relative to the energy waveguide element 720a depending on the respective energy locations 1406, 1408 on the first side of the energy relay element 706.

In an embodiment, a process 1300 for 4D calibration may include a step 1302 in which data is received for data of energy attributes of energy along the uninhibited energy propagation paths 1402, 1404 on the second side of the waveguide array is received, and a step 1304 in which data of energy attributes of energy at the plurality of energy locations 1406, 1408 on the first side of the energy waveguide element and the data of energy attributes of energy along the uninhibited energy propagation paths 1402 and 1404 on the second side of the energy waveguide element to create are correlated to create a calibrated four-dimensional (4D) plenoptic function for the waveguide element 720a. The calibrated 4D plenoptic function may include a mapping between the plurality of energy locations 1406, 1408 and the respective angular directions of the energy propagation paths 1402, 1404.

In an embodiment, the data of energy attributes of energy along the uninhibited energy propagation paths 1402, 1404 on the second side of the waveguide array may be generated by the energy sensor 902 capturing energy along the uninhibited energy propagation paths 1402, 1404 on the second side of the waveguide array. In an embodiment, the energy sensor 902 may be configured to receive an operating parameter of the energy sensor 902 from the controller 906, which may be programmed to operate the energy sensor 902 according to a predetermined instruction. In an embodiment, the operating parameter may be provided in a digital signal from the controller 906. In an embodiment, the operating parameter may include position instruction where the controller 906 is programmed to position the sensor 902 according to the predetermined instruction.

In an embodiment, data of energy attributes of energy along the uninhibited energy propagation paths 1402, 1404 on the second side of the waveguide array may generated by positioning the movable platform 904 on which the energy relay element 708 is located, and by operating the energy sensor 902 to capture energy along the uninhibited energy propagation paths 1402, 1404 on the second side of the waveguide array when the energy relay element 708 is located at a predetermined position. In an embodiment, the movable platform 904 and the sensor 902 are configured to receive digital signals from the controller 906, which may be programmed to operate the energy sensor 902 and the movable platform 904 according to a predetermined instruction. In an embodiment, the digital signals may comprise position instructions for the energy sensor 902 and the movable platform 904, and the controller 906 is programmed to position the energy sensor 902 and movable platform 904 according to the predetermined instruction.

It is to be appreciated that the energy attributes being correlated and mapped in step 1304 may include at least one energy attribute selected from a group consisting of position, color, intensity, frequency, amplitude, contrast, and resolution. In an embodiment, the calibrated 4D plenoptic function may be applied to compensate for at least one waveguide array attribute selected from a group consisting of: an intensity variation, a color variation, an attenuating region, and a spatial distortion. In an embodiment, process 1100 or 1200 may be performed to compensate for at least one relay attribute, followed by process 1300 to compensate for at least one waveguide array attribute, thereby compensating for the energy directing system 700 as a whole.

In an embodiment, the energy attributes of energy along the uninhibited energy propagation paths 1402, 1404 on the second side of the energy waveguide element 720a comprise at least angular coordinates $(u_1, v_1)$, $(u_2, v_2)$ of the uninhibited energy propagation paths 1402,1404, and the energy attributes of energy at the plurality of energy locations 1406, 1408 on the first side of the energy waveguide element 720a comprise at least position coordinates of the plurality of energy locations. In an embodiment, the position coordinates for the plurality of energy locations 1406, 1408 may be defined in a physical reference space or converted from a digital reference space to a physical reference space using a conversion function as discussed above with respect to processes 1100 and 1200.

In an embodiment, the energy location mapping process of 1100 may be performed before process 1300 so that the position coordinates for the plurality of energy locations 1406, 1408 may be used to determine the angular coordinates $(u_1, v_1)$, $(u_2, v_2)$ of the uninhibited energy propagation paths 1402,1404, respectively in a physical reference space. In an embodiment, the angular coordinates $(u_1, v_1)$, $(u_2, v_2)$ of the uninhibited energy propagation paths 1402, 1404, in a physical reference space may be determined using a known reference position of the energy waveguide element 720a, a known distance 1410 between the sensor 902 and the waveguide element 720a, and known position of a reference energy location 712a, all of which is defined in the same physical reference space. For example, an energy propagation axis 1412 may be defined in the waveguide element 720a and used as a reference position. The distance 1410 between the sensor 902 and the waveguide element 720a may be determined according to a number of measurement methods known in the art. Given these known reference parameters in the physical reference space, the angular coordinates $(u_1, v_1)$, $(u_2, v_2)$ of the uninhibited energy propagation paths 1402, 1404 may be determined using a triangulation of data points obtained by the sensor 902 with the known reference parameters in the physical reference space.

Example Implementation 2

For the purpose of illustrating the principles of the present disclosure, an example of implementing embodiments of the mapping 1300 is provided below with respect to a display system with a display surface and pixels of illumination sources that may provide an image to the display surface and a waveguide array such as a micro lens array for directing light from the display surface to views according to a 4D plenoptic function. It is to be appreciated that other implementations in accordance with the principles of the present disclosure may be carried out for other types of energy systems, such as acoustic, infrared, ultraviolet, microwave, x-ray, electro-magnetic, optical-mechanical, or tactile energy system.

1. Measure the distance between a known vertical reference laser beam and a corner of the display.
2. Determine the lens locations for measurement. This may be a regular sampling across the display surface.
3. Use the known lens location geometry to direct the translation stage to move the display so the camera is directly over each lens center.
4. Illuminate each pixel under the lens. For each, measure the beam position on the camera sensor.
5. Use this beam position, and the known height of the sensor above the lens to determine the angles the beam makes with the vertical z axis in the x-z plane ($\theta$) and y-z plane ($\varphi$). These angles can be converted to the normalized (u, v) coordinates.
6. Repeat this for many of the pixels under the lens.
7. Repeat this procedure for a regular sampling of disks across the display surface.
8. Find the (u, v) coordinates as a function of pixel offset from disk center, and fit the variation of this parameter to a polynomial in each axis along the width and height of the entire display surface.

While various embodiments in accordance with the principles disclosed herein have been described above, it should be understood that they have been presented by way of example only, and are not limiting. Thus, the breadth and scope of the invention(s) should not be limited by any of the above-described exemplary embodiments, but should be defined only in accordance with the claims and their equivalents issuing from this disclosure. Furthermore, the above advantages and features are provided in described embodiments, but shall not limit the application of such issued claims to processes and structures accomplishing any or all of the above advantages.

It will be understood that the principal features of this disclosure can be employed in various embodiments without departing from the scope of the disclosure. Those skilled in the art will recognize, or be able to ascertain using no more than routine experimentation, numerous equivalents to the specific procedures described herein. Such equivalents are considered to be within the scope of this disclosure and are covered by the claims.

Additionally, the section headings herein are provided for consistency with the suggestions under 37 CFR 1.77 or otherwise to provide organizational cues. These headings shall not limit or characterize the invention(s) set out in any claims that may issue from this disclosure. Specifically, and by way of example, although the headings refer to a "Field of Invention," such claims should not be limited by the language under this heading to describe the so-called technical field. Further, a description of technology in the "Background of the Invention" section is not to be construed as an admission that technology is prior art to any invention(s) in this disclosure. Neither is the "Summary" to be considered a characterization of the invention(s) set forth in issued claims. Furthermore, any reference in this disclosure to "invention" in the singular should not be used to argue that there is only a single point of novelty in this disclosure. Multiple inventions may be set forth according to the limitations of the multiple claims issuing from this disclosure, and such claims accordingly define the invention(s), and their equivalents, that are protected thereby. In all instances, the scope of such claims shall be considered on their own merits in light of this disclosure, but should not be constrained by the headings set forth herein.

The use of the word "a" or "an" when used in conjunction with the term "comprising" in the claims and/or the specification may mean "one," but it is also consistent with the meaning of "one or more," "at least one," and "one or more than one." The use of the term "or" in the claims is used to mean "and/or" unless explicitly indicated to refer to alternatives only or the alternatives are mutually exclusive, although the disclosure supports a definition that refers to only alternatives and "and/or." Throughout this application, the term "about" is used to indicate that a value includes the inherent variation of error for the device, the method being employed to determine the value, or the variation that exists among the study subjects. In general, but subject to the preceding discussion, a numerical value herein that is modified by a word of approximation such as "about" may vary from the stated value by at least ±1, 2, 3, 4, 5, 6, 7, 10, 12 or 15%.

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

Words of comparison, measurement, and timing such as "at the time," "equivalent," "during," "complete," and the like should be understood to mean "substantially at the time," "substantially equivalent," "substantially during," "substantially complete," etc., where "substantially" means that such comparisons, measurements, and timings are practicable to accomplish the implicitly or expressly stated desired result. Words relating to relative position of elements such as "near," "proximate to," and "adjacent to" shall mean sufficiently close to have a material effect upon the respective system element interactions. Other words of approximation similarly refer to a condition that when so modified is understood to not necessarily be absolute or perfect but would be considered close enough to those of ordinary skill in the art to warrant designating the condition as being present. The extent to which the description may vary will depend on how great a change can be instituted and still have one of ordinary skilled in the art recognize the modified feature as still having the desired characteristics and capabilities of the unmodified feature.

The term "or combinations thereof" as used herein refers to all permutations and combinations of the listed items preceding the term. For example, A, B, C, or combinations thereof is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, AB, BBC, AAABCCCC, CBBAAA, CABABB, and so forth. The skilled artisan will understand that typically there is no limit on the number of items or terms in any combination, unless otherwise apparent from the context.

All of the compositions and/or methods disclosed and claimed herein can be made and executed without undue experimentation in light of the present disclosure. While the compositions and methods of this disclosure have been described in terms of preferred embodiments, it will be apparent to those of skill in the art that variations may be applied to the compositions and/or methods and in the steps or in the sequence of steps of the method described herein without departing from the concept, spirit and scope of the disclosure. All such similar substitutes and modifications apparent to those skilled in the art are deemed to be within the spirit, scope and concept of the disclosure as defined by the appended claims.

What is claimed is:

1. A method of calibration for an energy relay element, wherein the energy relay element comprises a plurality of component engineered structures extending between first and second surfaces of the energy relay element, the plurality of component engineered structures are arranged such that energy propagating through the plurality of the component engineered structures of the energy relay element has higher transport efficiency in a longitudinal orientation, the method comprising:
    receiving data of energy attributes of energy at a first plurality of energy locations on the first surface of the energy relay element, wherein energy at the first plurality of energy locations was relayed from a second plurality of energy locations on the second surface of the relay element through the plurality of component engineered structures of the energy relay element along the longitudinal orientation to the first plurality of energy locations on the first surface of the energy relay element; and
    correlating predetermined data of energy attributes of energy at the second plurality of energy locations and the data of energy attributes of energy at the first plurality of energy locations to create a calibrated relay function;
    wherein, the calibrated relay function comprises a mapping of the energy attributes at the first plurality of energy locations to the energy attributes at the second plurality of energy locations.

2. The method of claim 1, wherein the energy attributes at the first plurality of energy locations comprise at least position coordinates defined in a physical reference space, and the energy attributes at the second plurality of energy locations comprise at least position coordinates defined in a first digital reference space.

3. The method of claim 2, wherein the position coordinates defined in the physical reference space are converted from a second digital reference space.

4. The method of claim 1, wherein the method further comprises:
    receive data of captured reference energy attributes of reference energy that was captured at the first plurality of energy locations at the first surface of the energy relay element, wherein the reference energy, the reference energy having predetermined reference energy attributes defined in a physical reference space; and
    correlating the predetermined reference energy attributes to the captured reference energy attributes to generate a conversion function; and
    applying the conversion function to the energy attributes of energy at the first plurality of energy locations to map energy attributes of energy defined in a digital reference system to energy attributes of energy in the physical reference space;
    whereby the mapping of the calibrated relay function maps the energy attributes at the first plurality of energy locations to the energy attributes at the second plurality of energy, in which the energy attributes at the first plurality of energy locations is defined in the physical reference space, and the energy attributes at the second plurality of energy is defined in the digital reference space.

5. The method of claim 4, wherein the predetermined reference energy attributes comprise at least one energy attribute selected from a group consisting of position, color, intensity, frequency, amplitude, contrast, and resolution.

6. The method of claim 4, wherein the reference energy forms a reference spatial pattern and further wherein the reference energy captured at the first plurality of energy locations at the first surface forms a captured pattern.

7. The method of claim 5, wherein position attributes of the reference spatial pattern are known in the physical reference space.

8. The method of claim 1, wherein data of energy attributes of energy at the first plurality of energy locations is generated by an energy sensor capturing energy from first plurality of energy locations.

9. The method of claim 8, wherein the energy sensor comprises a camera, a line scanning device, a plurality of pressure sensors disposed in a spatial array, or a plurality of acoustic sensors disposed in a spatial array.

10. The method of claim 8, wherein the sensor is configured to receive an operating parameter of the energy sensor from a controller, the controller programmed to operate the energy sensor according to a predetermined instruction.

11. The method of claim 10, wherein the operating parameter is provided in a digital signal from the controller.

12. The method of claim 11, wherein the operating parameter comprises position instruction, and the controller is programmed to position the sensor according to the predetermined instruction.

13. The method of claim 8, wherein data of energy attributes of energy at the first plurality of energy locations is generated by positioning a movable platform on which an energy relay element is located, and by operating an energy sensor to capture energy from first plurality of energy locations when the energy relay element is located at a predetermined position.

14. The method of claim 13, wherein the movable platform and the energy sensor are configured to receive digital signals from a controller, the controller programmed to operate the energy sensor and the movable platform according to a predetermined instruction.

15. The method of claim 14, wherein the digital signals comprise position instructions for the energy sensor and the movable platform, and the controller is programmed to position the energy sensor and movable platform according to the predetermined instruction.

16. The method of claim 1, wherein the energy attributes of energy at the first plurality of energy locations comprise at least one energy attribute selected from a group consisting of position, color, intensity, frequency, amplitude, contrast, and resolution.

17. The method of claim 1, wherein the energy attributes of energy at the second plurality of energy locations comprise at least one energy attribute selected from a group consisting of position, color, intensity, frequency, amplitude, contrast, and resolution.

18. The method of claim 1, wherein the calibration mapping is applied to compensate for at least one relay attribute selected from a group consisting of: an intensity variation, a color variation, an attenuating region, and a spatial distortion.

* * * * *